(12) United States Patent
Kosaka et al.

(10) Patent No.: US 12,407,936 B2
(45) Date of Patent: Sep. 2, 2025

(54) SOLID STATE IMAGING ELEMENT, IMAGING APPARATUS, AND METHOD FOR CONTROLLING SOLID STATE IMAGING ELEMENT

(71) Applicant: SONY SEMICONDUCTOR SOLUTIONS CORPORATION, Kanagawa (JP)

(72) Inventors: Takuro Kosaka, Kanagawa (JP); Yosuke Ueno, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 149 days.

(21) Appl. No.: 18/003,183

(22) PCT Filed: May 7, 2021

(86) PCT No.: PCT/JP2021/017435
§ 371 (c)(1),
(2) Date: Dec. 23, 2022

(87) PCT Pub. No.: WO2022/004125
PCT Pub. Date: Jan. 6, 2022

(65) Prior Publication Data
US 2023/0254609 A1 Aug. 10, 2023

(30) Foreign Application Priority Data
Jul. 1, 2020 (JP) .................................. 2020-113705

(51) Int. Cl.
H04N 23/71 (2023.01)
H04N 25/78 (2023.01)
(52) U.S. Cl.
CPC ............. *H04N 23/71* (2023.01); *H04N 25/78* (2023.01)

(58) Field of Classification Search
CPC .............................. H04N 25/78; H04N 23/71
See application file for complete search history.

(56) References Cited

U.S. PATENT DOCUMENTS

| 2015/0122975 A1 | 5/2015 | Saito |
| 2016/0309100 A1 | 10/2016 | Abe |

(Continued)

FOREIGN PATENT DOCUMENTS

| CN | 101437119 A | 5/2009 |
| CN | 101834161 A | 9/2010 |

(Continued)

OTHER PUBLICATIONS

International Search Report and Written Opinion of PCT Application No. PCT/JP2021/017435, issued on Jul. 13, 2021, 09 pages of ISRWO.

(Continued)

*Primary Examiner* — Christopher K Peterson
(74) *Attorney, Agent, or Firm* — CHIP LAW GROUP

(57) ABSTRACT

There is provided a solid state imaging element includes a current source, a pixel circuit, a comparison circuit, a control section, and a counter. The current source generates a constant current. The pixel circuit generates a pixel signal of a higher voltage than a predetermined lower limit voltage in accordance with conductance of the current source. The comparison circuit amplifies the pixel signal at a predetermined amplification rate and compares the amplified pixel signal with a predetermined reference signal. The control section decreases conductance as the amplification rate increases. The counter counts count values in a period of time until a comparison result of the comparison circuit is inverted and outputs the count values.

4 Claims, 32 Drawing Sheets

(56) References Cited

U.S. PATENT DOCUMENTS

2017/0034467 A1\* 2/2017 Okada .................... H04N 23/76
2018/0048872 A1   2/2018 Matsumoto
2018/0103222 A1\* 4/2018 Yan ........................ H10F 39/18

FOREIGN PATENT DOCUMENTS

| CN | 101990070 A | 3/2011 |
|---|---|---|
| CN | 102202186 A | 9/2011 |
| CN | 102905088 A | 1/2013 |
| CN | 103002228 A | 3/2013 |
| CN | 106878633 A | 6/2017 |
| JP | 2014017838 A | 1/2014 |
| JP | 2019041200 A | 3/2019 |
| WO | 2015/159730 A1 | 10/2015 |
| WO | 2018/030137 A1 | 2/2018 |

OTHER PUBLICATIONS

Francis Caster II, "Design and Analysis of a W-band 9-Element Imaging Array Receiver Using Spatial-Overlapping Super-Pixels in Silicon", IEEE Journal of Solid State Circuits, Jun. 6, 2014, Full text.

Yang Shaohua, "Design of digital EMCCD camera with mega pixels", Optics and Precision Engineering, Dec. 15, 2011, Full text.

\* cited by examiner

FIG. 8

| LUMINANCE OF ENVIRONMENTAL LIGHT | SETTING VALUE OF ANALOG GAIN | CURRENT SOURCE CONDUCTANCE | VSL DYNAMIC RANGE | RTS NOISE |
|---|---|---|---|---|
| HIGH (>PREDETERMINED VALUE) | LOW (≤BOUNDARY VALUE) | HIGH | WIDE | LARGE |
| LOW (≤PREDETERMINED VALUE) | HIGH (>BOUNDARY VALUE) | LOW | NARROW | SMALL |

SOLID STATE IMAGING ELEMENT, IMAGING APPARATUS, AND METHOD FOR CONTROLLING SOLID STATE IMAGING ELEMENT

CROSS REFERENCE TO RELATED APPLICATIONS

This application is a U.S. National Phase of International Patent Application No. PCT/JP2021/017435 filed on May 7, 2021, which claims priority benefit of Japanese Patent Application No. JP 2020-113705 filed in the Japan Patent Office on Jul. 1, 2020. Each of the above-referenced applications is hereby incorporated herein by reference in its entirety.

TECHNICAL FIELD

The present technology relates to a solid state imaging element. Specifically, the present technology relates to a solid-state imaging element that performs analog-to-digital conversion using a comparator and a counter, an imaging apparatus, and a control method for the solid state imaging element.

BACKGROUND ART

In the related art, a single-slope-type analog-to-digital converter (ADC) has been used for analog-to-digital (AD) conversion in a solid state imaging element or the like due to its simple structure. The single-slope-type ADC is typically configured of a comparator and a counter that performs counting on the basis of a comparison result of the comparator. A solid state imaging element in which a p-channel metal-oxide-semiconductor (pMOS) transistor, a current source, and an inverter are disposed, for example, in the comparator has been proposed (see Patent Document 1, for example). A reference signal is input to a gate of the pMOS transistor, a pixel signal is input to a source via a vertical signal line, and a current source is connected to a drain. Also, a voltage at a connection node of the pMOS transistor and the current source is output as a result of comparing the pixel signal with the reference signal to the counter via the inverter.

CITATION LIST

Patent Document

Patent Document 1: US Patent Application Publication No. 2018/0103222

SUMMARY OF THE INVENTION

Problems to be Solved by the Invention

In the aforementioned solid state imaging element, power consumption is reduced as compared with a configuration in which a comparator is also provided with a power source separately from a pixel circuit, by the comparator sharing the power source of the pixel circuit. However, in the aforementioned solid state imaging element, the current source and the pMOS transistor are connected in series to the vertical signal line, and a dynamic range of the pixel signal may thus be degraded as compared with a case where they are not connected. Additionally, noise generated by the current source increases as conductance is increased to expand the dynamic range. Therefore, it is not possible to achieve both expansion of the dynamic range and noise reduction in the aforementioned solid state imaging element, and there is a problem that image quality of image data may be degraded due to shortage of the dynamic range and an increase in noise.

The present technology was made in view of such circumstances, and an object thereof is to improve the image quality of image data in a solid state imaging element using a comparator.

Solutions to Problems

The present technology was made in order to solve the aforementioned problem, and according to a first aspect thereof, there are provided a solid state imaging element that includes: a current source that generates a constant current; a pixel circuit that generates a pixel signal of a higher voltage than a predetermined lower limit voltage in accordance with a conductance of the current source; a comparison circuit that amplifies the pixel signal at a predetermined amplification rate and compares the amplified pixel signal with a predetermined reference signal; a control section that reduces the conductance as the amplification rate increases; and a counter that counts count values in a period of time until a comparison result of the comparison circuit is inverted and outputs the count values, and a method for controlling the solid state imaging element. This leads to an effect of improving image quality of image data.

Also, in the first aspect, the current source may include a plurality of transistors and a switching circuit that switches a connection mode of the plurality of transistors. This leads to an effect that the conductance of the current source is controlled.

Also, in the first aspect, the plurality of transistors may include a first switch that connects a connection node of the first and second transistors to a predetermined ground terminal, a second switch that connects a source of the second transistor to the comparison circuit, and a third switch that connects the source of the second transistor to the ground terminal. This leads to an effect that the conductance is controlled in two stages.

Also, in the first aspect, the plurality of transistors may include first, second, third, and fourth transistors that are connected in series to the comparison circuit, and the switching circuit may include a first switch that connects a connection node of the first and second transistors to a predetermined ground terminal, a second switch that connects a connection node of the second and third transistors to the comparison circuit, a third switch that connects a connection node of the second and third transistors to the ground terminal, a fourth switch that connects a connection node of the third and fourth transistors to the comparison circuit, a fifth switch that connects a connection node of the third and fourth transistors to the ground terminal, a sixth switch that connects a source of the fourth transistor to the comparison circuit, and a seventh switch that connects the source of the fourth transistor to the ground terminal. This leads to an effect that the conductance is controlled in three stages.

Also, in the first aspect, the plurality of transistors may include a first transistor that has a drain connected to the comparison circuit, and a second transistor that has a source connected to a predetermined ground terminal, and the switching circuit may include a first switch that connects a source of the first transistor to the ground terminal, a second switch that connects the source of the first transistor to a drain of the second transistor, and a third switch that connects the drain of the second transistor to the comparison circuit. This leads to an effect that a surge current is curbed Also, in the first aspect, the plurality of transistors may include a first transistor that has a drain connected to the comparison circuit, second and third transistors, and a fourth transistor that has a source connected to a predetermined ground terminal, and the switching circuit may include a first switch that connects a source of the first transistor to the ground terminal, a second switch that connects the source of the first transistor to a drain of the second transistor, a third switch that connects a drain of the second transistor to the comparison circuit, a fourth switch that connects a source of the second transistor to the ground terminal, a fifth switch that connects the source of the second transistor to a drain of the third transistor, a sixth switch that connects the drain of the third transistor to the comparison circuit, a seventh switch that connects a source of the third transistor to the ground terminal, an eighth switch that connects the source of the third transistor to a drain of the fourth transistor, and a ninth switch that connects the drain of the fourth transistor to the comparison circuit. This leads to an effect that a surge current is curbed the conductance is controlled in three stages.

Also, in the first aspect, a bias circuit that generates a constant reference current may be further included, and the reference current may be copied by the current source. This leads to an effect that the amount of current is maintained to be constant.

Also, in the first aspect, an image processing section that measures an illuminance on the basis of image data in which the count values are arranged may be further included, and the control section may control the amplification rate to a value in accordance with the illuminance. This leads to an effect that the conductance is controlled in accordance with the illuminance.

Also, in the first aspect, the pixel circuit may be connected to the comparison circuit via a vertical signal line, and the comparison circuit may be inserted between the vertical signal line and the current source. This leads to an effect that the lower limit voltage becomes a value in accordance with operation voltages of the comparison circuit and the current source.

Also, in the first aspect, the pixel circuit may be connected to the comparison circuit via a vertical signal line, and the comparison circuit may be connected to the vertical signal line. This leads to an effect that the lower limit voltage becomes a value in accordance with an operation voltage of the current source.

Also, in the first aspect, a generator that generates an output signal with a sawtooth waveform; and a source follower transistor that outputs a signal in accordance with the output signal as the reference signal from a source may be further included, and the current source may include an intra-comparator current source that is connected to the comparison circuit, and a source follower current source that is connected to the source of the source follower transistor. This leads to an effect that a control range of the amplitude of the reference signal increases.

Also, according to a second aspect of the present technology, there is provided an imaging apparatus including: a current source that generates a constant current; a pixel circuit that generates a pixel signal of a higher voltage than a predetermined lower limit voltage in accordance with conductance of the current source; a comparison circuit that amplifies the pixel signal at a predetermined amplification rate and compares the amplified pixel signal with a predetermined reference signal; a control section that reduces the conductance as the amplification rate increases; a counter that counts count values in a period of time until a comparison result of the comparison circuit is inverted and outputs the count values; and a storage section that stores image data in which digital signals indicating the count values are arranged. This leads to an effect that image data with improved image quality is captured.

Also, according to a third aspect of the present technology, there is provided a light detection device including: a pixel that outputs a pixel signal in accordance with incident light; a vertical signal line that transmits the pixel signal; a comparator that includes a transistor having a source and a drain, any one of which is connected to the vertical signal line, and a gate receiving a reference signal; and a current source that is connected to the other one of the source and the drain of the transistor, in which the current source includes a plurality of transistors, and a switching circuit that switches a connection mode of the plurality of transistors. This leads to an effect of improving image quality of image data.

Also, in the third aspect, the plurality of transistors may include first and second transistors that are connected in series to the comparison circuit, and the switching circuit may include a first switch that connects a connection node of the first and second transistors to a predetermined ground terminal, a second switch that connects a source of the second transistor to the comparison circuit, and a third switch that connects the source of the second transistor to the ground terminal. This leads to an effect that the conductance is controlled in two stages.

Also, in the third aspect, the plurality of transistors may include first, second, third, and fourth transistors that are connected in series to the comparison circuit, and the switching circuit may include a first switch that connects a connection node of the first and second transistors to a predetermined ground terminal, a second switch that connects a connection node of the second and third transistors to the comparison circuit, a third switch that connects a connection node of the second and third transistors to the ground terminal, a fourth switch that connects a connection node of the third and fourth transistors to the comparison circuit, a fifth switch that connects a connection node of the third and fourth transistors to the ground terminal, a sixth switch that connects a source of the fourth transistor to the comparison circuit, and a seventh switch that connects the source of the fourth transistor to the ground terminal. This leads to an effect that the conductance is controlled in three stages.

Also, in the third aspect, the plurality of transistors may include a first transistor that has a drain connected to the comparison circuit, and a second transistor that has a source connected to a predetermined ground terminal, and the switching circuit may include a first switch that connects a source of the first transistor to the ground terminal, a second switch that connects the source of the first transistor to a drain of the second transistor, and a third switch that connects the drain of the second transistor to the comparison circuit. This leads to an effect that a surge current is curbed Also, in the third aspect, the plurality of transistors may include a first transistor that has a drain connected to the comparison circuit, second and third transistors, and a fourth transistor that has a source connected to a predetermined ground terminal, and the switching circuit may include a first switch that connects a source of the first transistor to the ground terminal, a second switch that connects the source of the first transistor to a drain of the second transistor, a third switch that connects a drain of the second transistor to the comparison circuit, a fourth switch that connects a source of the second transistor to the ground terminal, a fifth switch that connects the source of the second transistor to a drain of the third transistor, a sixth switch that connects the drain of the third transistor to the comparison circuit, a seventh switch that connects a source of the third transistor to the ground terminal, an eighth switch that connects the source of the third transistor to a drain of the fourth transistor, and a ninth switch that connects the drain of the fourth transistor to the comparison circuit. This leads to an effect that a surge current is curbed the conductance is controlled in three stages.

BRIEF DESCRIPTION OF DRAWINGS

FIG. 8 is a diagram for explaining control of conductance according to the first embodiment of the present technology.

MODE FOR CARRYING OUT THE INVENTION

Hereinafter, modes for carrying out of the present technology (hereinafter, referred to as embodiments) will be described. The description will be given in the following order.

1. First embodiment (example in which conductance of current source inside comparator is controlled)
2. Second embodiment (example in which conductance of current source inside comparator is controlled in three stages)

3. Third embodiment (example in which conductance of current source inside comparator is controlled and surge current is curbed)
4. Fourth embodiment (example in which conductance of current source inside comparator is controlled and current mirror circuit is used)
5. Fifth embodiment (example in which analog gain is set in accordance with illuminance and conductance of current source inside comparator is controlled)
6. Sixth embodiment (example in which conductance of current source inside ramp generation section is controlled)
7. Seventh embodiment (example in which conductance of current source outside comparator is controlled)
8. Examples of application to mobile body

1. First Embodiment

[Configuration Example of Imaging Apparatus]

Figure 1:
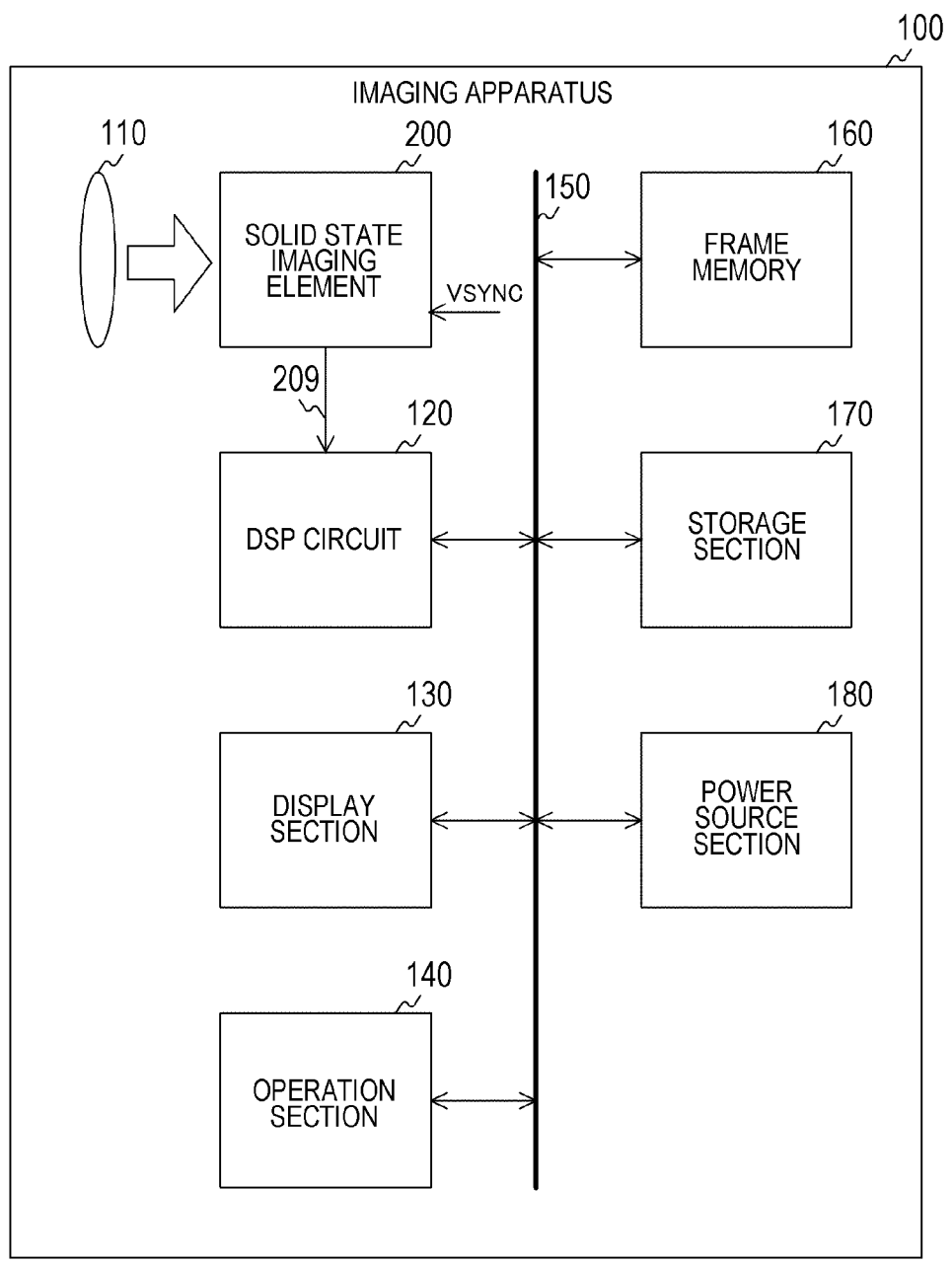
FIG. 1 is a block diagram illustrating a configuration example of an imaging apparatus according to a first embodiment of the present technology.

FIG. 1 is a block diagram illustrating a configuration example of an imaging apparatus 100 according to a first embodiment of the present technology. The imaging apparatus 100 is a device for capturing image data and includes an optical section 110, a solid state imaging element 200, and a digital signal processing (DSP) circuit 120. Moreover, the imaging apparatus 100 includes a display section 130, an operation section 140, a bus 150, a frame memory 160, a storage section 170, and a power source section 180. As the imaging apparatus 100, a camera mounted on a smartphone, an in-vehicle camera, or the like is assumed.

The optical section 110 is adapted to collect light from an object and guides the light to the solid state imaging element 200. The solid state imaging element 200 is adapted to generated image data through photoelectric conversion. The solid state imaging element 200 supplies the generated image data to the DSP circuit 120 via a signal line 209.

The DSP circuit 120 is adapted to execute predetermined signal processing on the image data. The DSP circuit 120 outputs the image data after the processing to the frame memory 160 or the like via the bus 150.

The display section 130 is adapted to display image data. As the display section 130, a liquid crystal panel or an organic electroluminescence (EL) panel, for example, is assumed. The operation section 140 is adapted to generate an operation signal in response to a user's operation.

The bus 150 is a common path for the optical section 110, the solid state imaging element 200, the DSP circuit 120, the display section 130, the operation section 140, the frame memory 160, the storage section 170, and the power source section 180 to exchange data with each other.

The frame memory 160 is adapted to hold image data. The storage section 170 is adapted to store various kinds of data such as image data. The power source section 180 is adapted to supply a power source to the solid state imaging element 200, the DSP circuit 120, the display section 130, and the like.

[Configuration Example of Solid State Imaging Element]

Figure 2:
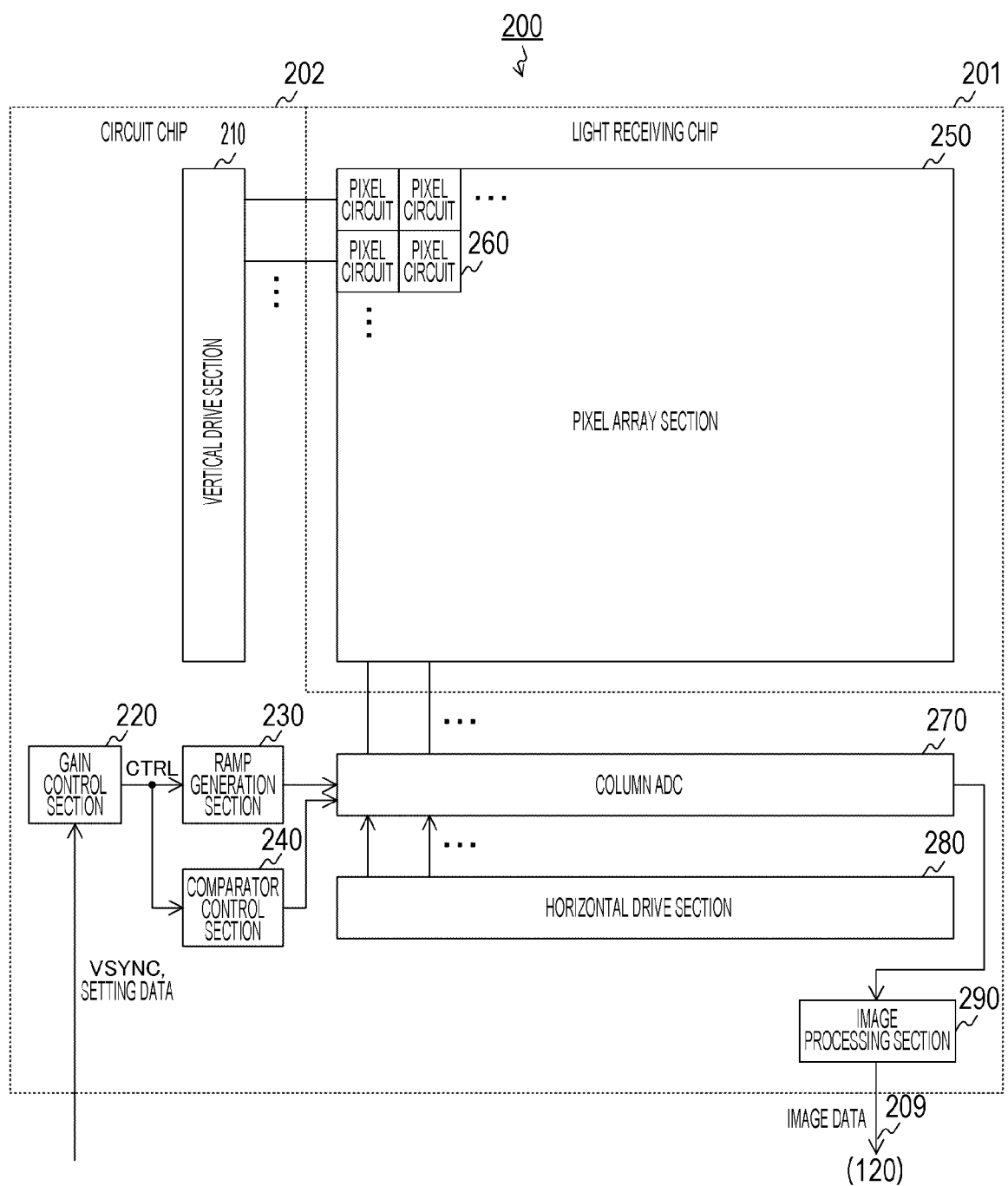
FIG. 2 is a block diagram illustrating a configuration example of a solid state imaging element according to the first embodiment of the present technology.

FIG. 2 is a block diagram illustrating a configuration example of a solid state imaging element 200 according to the first embodiment of the present technology. The solid state imaging element 200 includes a circuit chip 202 and a light receiving chip 201 laminated on the circuit chip 202. These chips are electrically connected through Cu—Cu bonding, for example. Note that it is also possible to establish the connection through a via or a bump rather than the Cu—Cu bonding.

The light receiving chip 201 includes a pixel array section 250 arranged thereon. In addition, a vertical drive section 210, a gain control section 220, a ramp generation section 230, a comparator control section 240, a column ADC 270, a horizontal drive section 280, and an image processing section 290 are arranged on the circuit chip 202.

Note that the circuit arranged on each of the light receiving chip 201 and the circuit chip 202 is not limited to the configuration illustrated as an example in the drawing. For example, it is also possible to arrange the pixel array section 250 and the comparator (not illustrated) in the column ADC 270 on the light receiving chip 201 and to arrange the other circuits on the circuit chip 202.

In the pixel array section 250, a plurality of pixel circuits 260 is aligned in a two-dimensional grid shape. Hereinafter, groups of the pixel circuits 260 aligned in a predetermined horizontal direction will be referred to as "rows" while groups of pixel circuits 260 aligned in a direction that is orthogonal to the rows will be referred to as "columns".

The vertical drive section 210 is adapted to drive the rows in order and cause the rows to output analog pixel signals to the column ADC 270.

The gain control section 220 is adapted to control an analog gain on the basis of setting data in synchronization with a vertical synchronization signal VSYNC. Here, the vertical synchronization signal VSYNC is a periodic signal of a predetermined frequency (such as 60 Hz) indicating an imaging timing. Moreover, the analog gain is an amplification rate when the comparator inside the column ADC 270 amplifies a pixel signal. The setting data is data indicating a setting value of the analog gain. The vertical synchronization signal VSYNC and the setting data are generated by a circuit (such as a DSP circuit 120) outside the solid state imaging element 200 and are then input to the solid state imaging element 200.

Also, the gain control section 220 generates a digital control signal CTRL for controlling the ramp generation section 230 and supplies the control signal CTRL to the ramp generation section 230 and the comparator control section 240.

The ramp generation section 230 is adapted to generate a ramp signal with a sawtooth waveform in accordance with the control signal CTRL and supply the ramp signal as a reference signal to the column ADC 270. The ramp generation section 230 is expressed by a digital-to-analog converter (DAC), for example.

Here, the gain control section 220 reduces the amplitude of the ramp signal using the control signal CTRL as the analog signal indicated by setting data is higher.

The comparator control section 240 is adapted to control conductance of the comparator (not illustrated) inside the column ADC 270 on the basis of the control signal CTRL. Details of control of the conductance will be described later.

An ADC (not illustrated) is arranged for each column in the column ADC 270. Each ADC converts a pixel signal of a corresponding column into a digital signal and supplies the digital signal to the image processing section 290 in accordance with control performed by the horizontal drive section 280.

The horizontal drive section 280 is adapted to control the column ADC 270 and cause the column ADC 270 to output a digital signal in order.

The image processing section 290 is adapted to perform various kinds of image processing, such as demosaic processing and white balance processing, on image data in which digital signals are aligned. The image processing section 290 supplies the image data after the processing to the DSP circuit 120 via the signal line 209. Note that it is also possible for a circuit (such as a DSP circuit 120) outside the solid state imaging element 200 to execute a part or entirety of the processing of the image processing section 290 instead of the image processing section 290.

[Configuration Example of Pixel Circuit]

Figure 3:
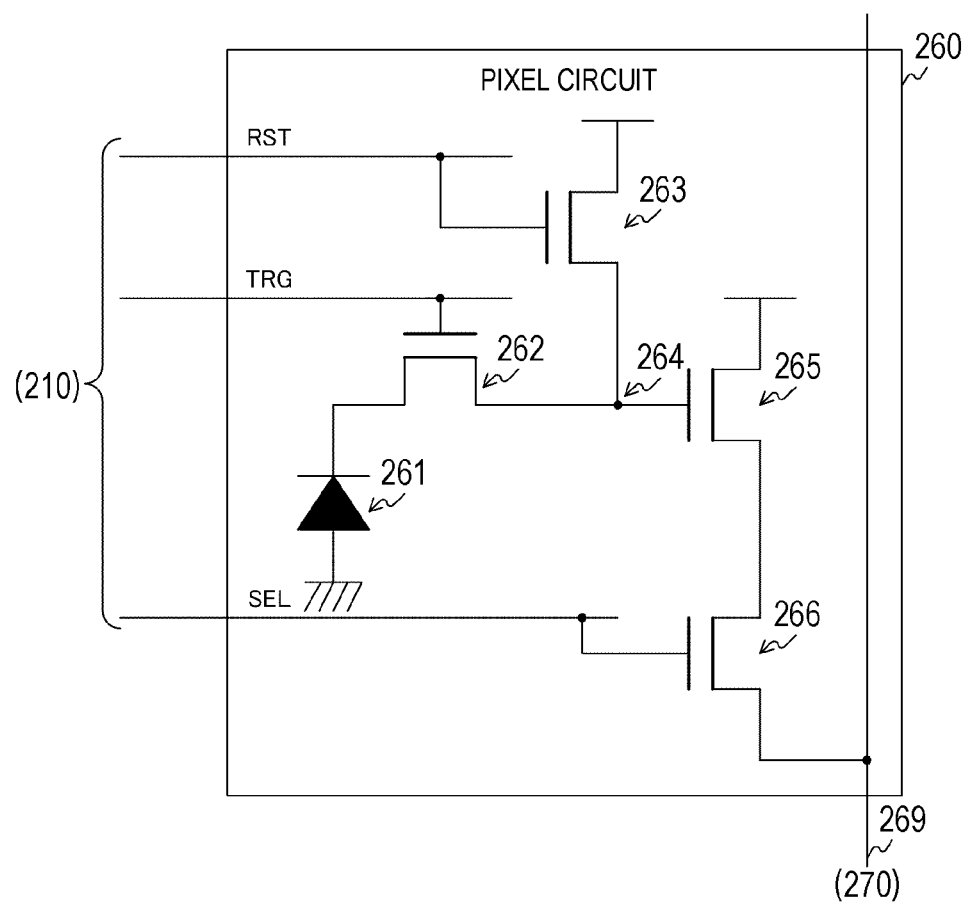
FIG. 3 is a circuit diagram illustrating a configuration example of a pixel circuit according to the first embodiment of the present technology.

FIG. 3 is a circuit diagram illustrating a configuration example of the pixel circuit 260 according to the first embodiment of the present technology. The pixel circuit 260 includes a photoelectric conversion element 261, a transfer transistor 262, a reset transistor 263, a floating diffusion layer 264, an amplification transistor 265, and a selection transistor 266. Also, a vertical signal line 269 is arranged in the vertical direction for each column in the pixel array section 250.

The photoelectric conversion element 261 is adapted to photoelectrically convert incident light and generate an electric charge. The transfer transistor 262 is adapted to transfer the electric charge from the photoelectric conversion element 261 to the floating diffusion layer 264 in accordance with a drive signal TRG from the vertical drive section 210.

The reset transistor 263 is adapted to withdraw the electrical charge from the floating diffusion layer 264 and initialize the electrical charge in accordance with a drive signal RST from the vertical drive section 210.

The floating diffusion layer 264 is adapted to accumulate the electric charge and generate a voltage in accordance with the amount of electric charge. The amplification transistor 265 is adapted to amplify the voltage of the floating diffusion layer 264.

The selection transistor 266 is adapted to output a signal of the amplified voltage as a pixel signal to the column ADC 270 via the vertical signal line 269 in accordance with a drive signal SEL from the vertical drive section 210.

Note that the pixel circuit 260 is not limited to the circuit illustrated as an example in the drawing as long as it is possible to generate an analog pixel signal through photoelectric conversion.

[Configuration Example of Column ADC]

Figure 4:
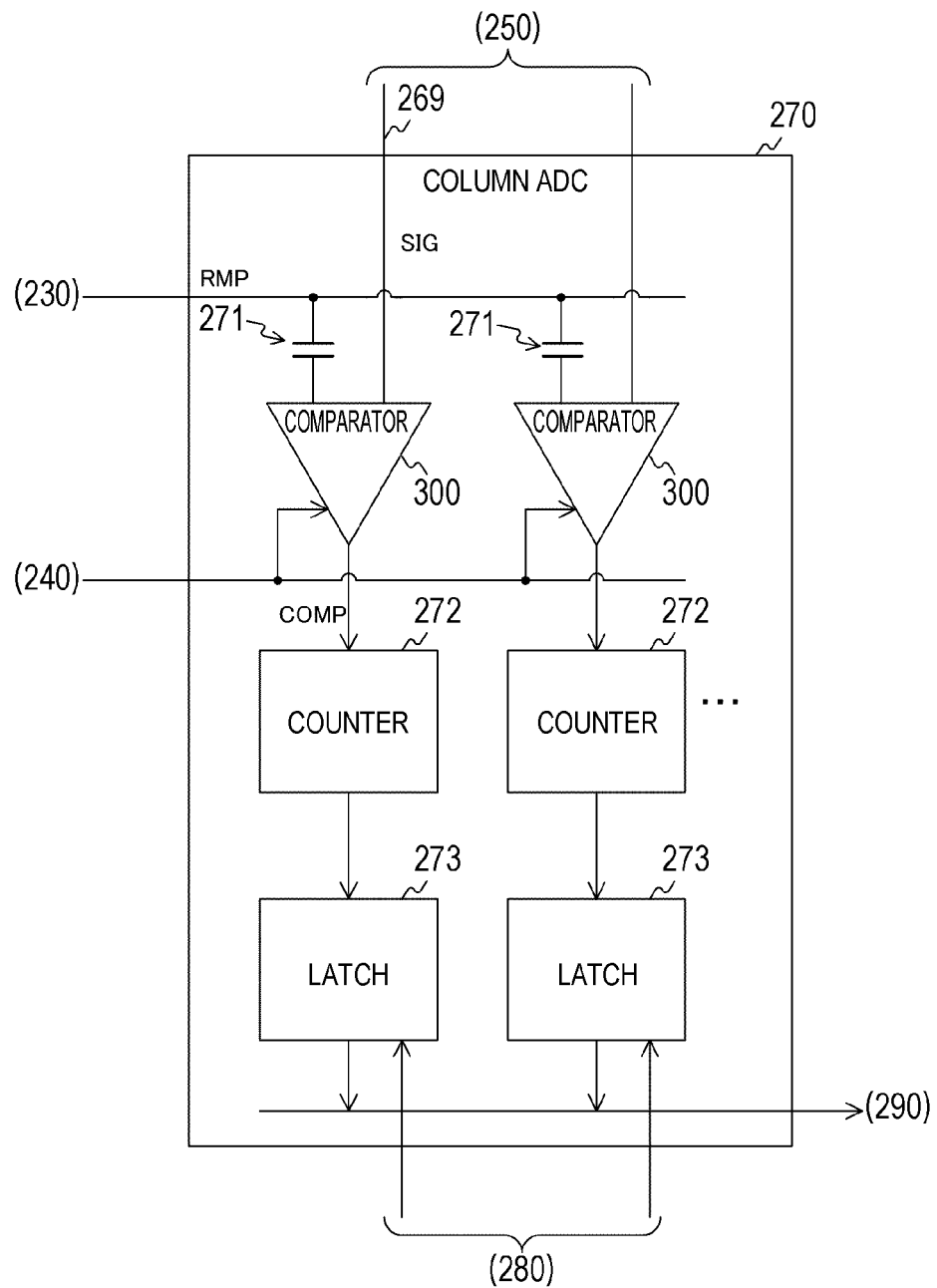
FIG. 4 is a block diagram illustrating a configuration example of a column ADC according to the first embodiment of the present technology.

FIG. 4 is a block diagram illustrating a configuration example of the column ADC 270 according to the first embodiment of the present technology. A capacitor 271, a comparator 300, a counter 272, and a latch 273 are arranged for each column in the column ADC 270. In a case where the number of columns is N (N is an integer), N capacitors 271, N comparators 300, N counters 272, and N latches 273 are arranged.

The comparator 300 is adapted to compare a reference signal RMP (ramp signal) from the ramp generation section 230 with a pixel signal SIG from the corresponding column. The reference signal RMP is input to the comparator 300 via the capacitor 271, and the pixel signal is input via the vertical signal line 269. The comparator 300 supplies the result COMP of comparing the reference signal RMP with the pixel signal SIG to the counter 272 of the corresponding column.

Also, a level of the pixel signal when the pixel circuit 260 is initialized will be referred to as a "reset level" below, and level of the pixel signal when the electric charge is transferred to the floating diffusion layer 264 will be referred to as a "signal level" below.

The counter 272 is adapted to count count values in a period of time until the comparison result COMP is inverted. The counter 272 performs decrementing counting in a period of time until the result COMP of comparison with the reset level is inverted and performs incrementing counting in a period until the result COMP of comparison with the signal level is inverted. In this manner, correlated double-sampling (CDS) processing for obtaining a difference between the reset level and the signal level is realized.

Also, the counter 272 causes the latch 273 to hold a digital signal indicating the count value. The comparator 300 and the counter 272 realize AD conversion processing for converting an analog pixel signal to a digital signal. In other words, the comparator 300 and the counter 272 function as an ADC. The ADC using the comparator and the counter in this manner is typically called a single-slope-type ADC.

Note that although the CDS processing is realized by the incrementing counting and decrementing counting, the present technology is not limited thereto. A configuration in which the counter 272 performs only either the incrementing counting or the decrementing counting and the CDS processing for obtaining a difference is executed by a circuit in the later stage may also be adopted.

The latch 273 is adapted to hold a digital signal. The latch 273 outputs the held digital signal to the image processing section 290 in accordance with control performed by the horizontal drive section 280.

Figure 5:
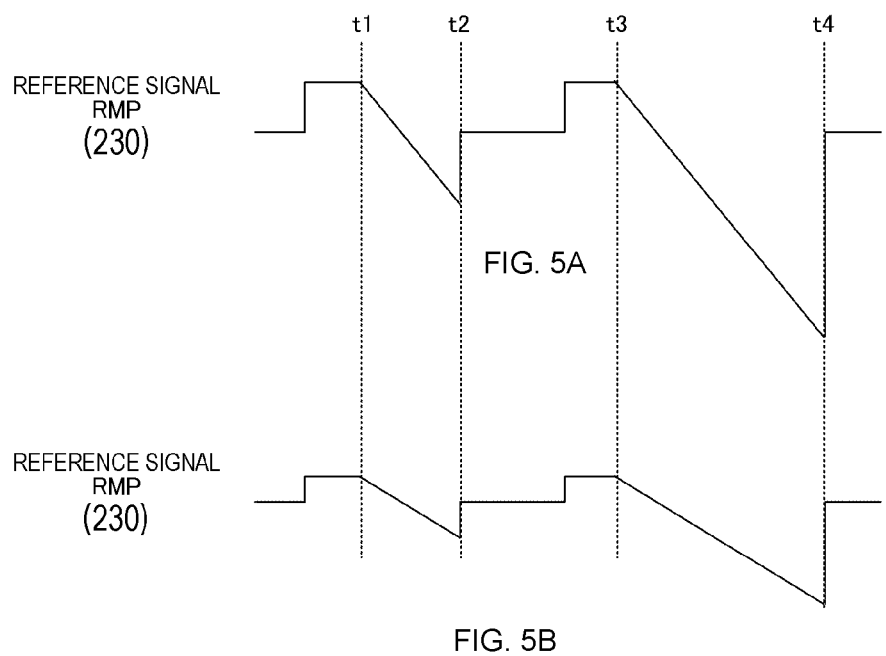
FIGS. 5A and 5B are diagrams illustrating an example of a waveform of a reference signal according to the first embodiment of the present technology.

FIGS. 5A and 5B are diagrams illustrating an example of a waveform of the reference signal RMP according to the first embodiment of the present technology. FIG. 5A illustrates an example of the waveform of the reference signal RMP at the time of control to a low gain which is an analog gain that is lower than a predetermined boundary value. FIG. 5B illustrates an example of the waveform of the reference signal RMP at the time of control to a high gain which is an analog gain that is higher than the boundary value.

As illustrated as an example in FIGS. 5A and 5B, the reference signal RMP gradually decreases in a period of time from a timing t1 to a timing t2 for AD converting the reset level. Also, the reference signal RMP also gradually decreases in a period of time from a timing t3 to a timing t4 for AD converting the signal level as well, and the amplitude thereof is larger than that in the AD conversion period of the reset level.

Also, as illustrated as an example in FIG. 5A, the amplitude of the reference signal RMP is a value that is larger in the case of control to the low gain than in the case of control to the high gain. Additionally, as illustrated as an example in FIG. 5B, the amplitude of the reference signal RMP is a value that is smaller in the case of control to the high gain than in the case of control to the low gain.

In a case where the level of the pixel signal is fixed, the time until the comparison result of the comparator 300 is inverted extends, and the count value of the counter 272 increases as the amplitude of the reference signal RMP decreases. In this manner, an effect that the pixel signal is amplified in the ADC including the comparator 300 and the counter 272 further occurs as the amplitude of the reference signal RMP decreases. The amplification rate of the pixel signal corresponds to the aforementioned analog gain.

In a case where illuminance of ambient light is high, a ratio of the signal level to the reset level increases, and setting data indicating a low gain is thus generated by the DSP circuit 120 or the like in order to curb a white spot. On the other hand, in a case where the illuminance of the ambient light is low, setting data indicating a high gain is generated by the DSP circuit 120 or the like in order to improve sensitivity. In this manner, a lower analog gain is set as the illuminance is higher.

[Configuration Example of Comparator]

Figure 6:
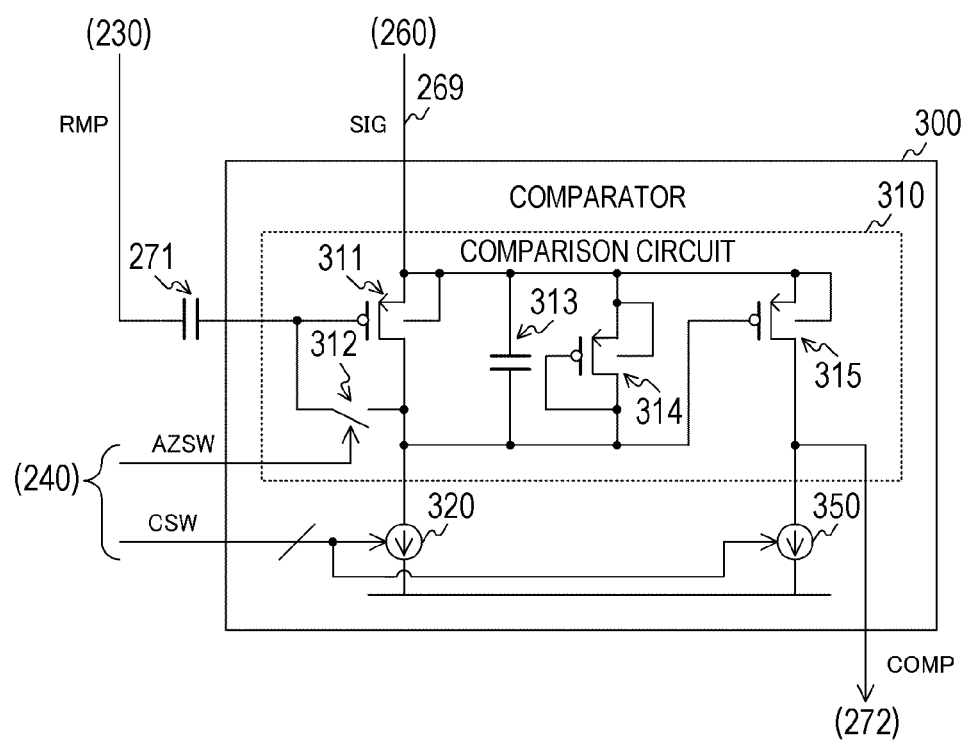
FIG. 6 is a circuit diagram illustrating a configuration example of a comparator according to the first embodiment of the present technology.

FIG. 6 is a circuit diagram illustrating a configuration example of the comparator 300 according to the first embodiment of the present technology. The comparator 300 includes a comparison circuit 310 and intra-comparator current sources 320 and 350.

The comparison circuit 310 is adapted to compare a pixel signal SIG from the pixel circuit 260 with the reference signal RMP from the ramp generation section 230 and supply the comparison result COMP to the counter 272. Furthermore, the pixel signal SIG is amplified with the analog gain in accordance with the amplitude of the reference signal RMP as described above.

The comparison circuit 310 includes an input transistor 311, an auto-zero switch 312, a capacitor 313, a clamp transistor 314, and an output transistor 315.

A source of the input transistor 311 is connected to the vertical signal line 269, and the pixel signal SIG is input to the source. Also, the reference signal RMP is input to a gate of the input transistor 311 via the capacitor 271. The input transistor 311 is brought into a voltage state that is the same as that at the auto-zero time when the voltage of the pixel signal input to the source and the voltage of the reference signal input to the gate substantially coincide with each other, and outputs a drain voltage in accordance with these voltages from a drain. Here, "substantially coincide" means that each change from a voltage value in the auto-zero period completely coincides or a difference therebetween is within a predetermined allowable value. As the input transistor 311, a pMOS transistor, for example, is used.

Also, it is desirable that a back gate and the source of the input transistor 311 be short-circuited to curb a back gate effect.

The auto-zero switch 312 is adapted to cause short-circuiting between the gate and the drain of the input transistor 311 in accordance with a control signal AZSW from the comparator control section 240.

The capacitor 313 is inserted between the source and the drain of the input transistor 311.

The clamp transistor 314 is inserted between the source and the drain of the input transistor 311. A pMOS transistor is used as the clamp transistor 314, and a gate thereof is short-circuited with the drain. Moreover, it is desirable that a back gate and a source of the clamp transistor 314 be short-circuited. The clamp transistor 314 can curb a decrease in drain voltage when the input transistor 311 is in a non-conductive state.

A source of the output transistor 315 is connected to the vertical signal line 269, and the pixel signal SIG is input to the source. Also, a gate of the output transistor 315 is connected to the drain of the input transistor 311, and a drain voltage is input to the gate. A pMOS transistor, for example is used as the output transistor 315. Moreover, it is desirable that a back gate and a source of the output transistor 315 be short-circuited.

The output transistor 315 outputs a signal indicating whether or not a difference between the voltage of the pixel signal SIG input to the source and the drain voltage input to the gate exceeds a predetermined threshold voltage as a comparison result COMP from the drain. The comparison result COMP is supplied to the counter 272.

Here, when the pixel signal SIG and the reference signal RMP substantially coincide with each other, the drain voltage of the input transistor 311 varies in accordance with the level of the pixel signal SIG. Therefore, the timing at which the drain voltage is inverted may deviate from an ideal timing at which the pixel signal SIG and the reference signal RMP substantially coincide with each other.

However, a voltage between the drain and the source of the input transistor 311 is input as a voltage between the gate and the source of the output transistor 315 through the connection in the drawing. Since the amount of variation in the drain voltage of the input transistor is equivalent to the amount of variation in voltage of the pixel signal SIG, the comparison result COMP from the output transistor 315 is inverted at an ideal timing at which the pixel signal SIG and the reference signal RMP substantially coincide with each other. It is thus possible to curb an error of the inversion timing by adding the output transistor 315.

The intra-comparator current source 320 is inserted between the drain of the input transistor 311 and a predetermined reference terminal (such as the ground terminal) and generates a constant current. The intra-comparator current source 350 is inserted between the drain of the output transistor 315 and the predetermined reference terminal (such as the ground terminal) and generates a constant current. Also, the comparator control section 240 controls conductance of the intra-comparator current sources 320 and 350 using the switching signals CSW. The conductance is substantially the same.

Note that although the clamp transistor 314 and the output transistor 315 are disposed in the comparison circuit 310, it is also possible to employ a configuration in which at least one of them is not provided. In a case where the output transistor 315 is not provided, the intra-comparator current source 350 is not needed. Also, although the comparator control section 240 controls conductance of both the intra-comparator current sources 320 and 350, it is also possible to control the conductance of only one of them and to keep the other conductance as a fixed value.

Figure 7:
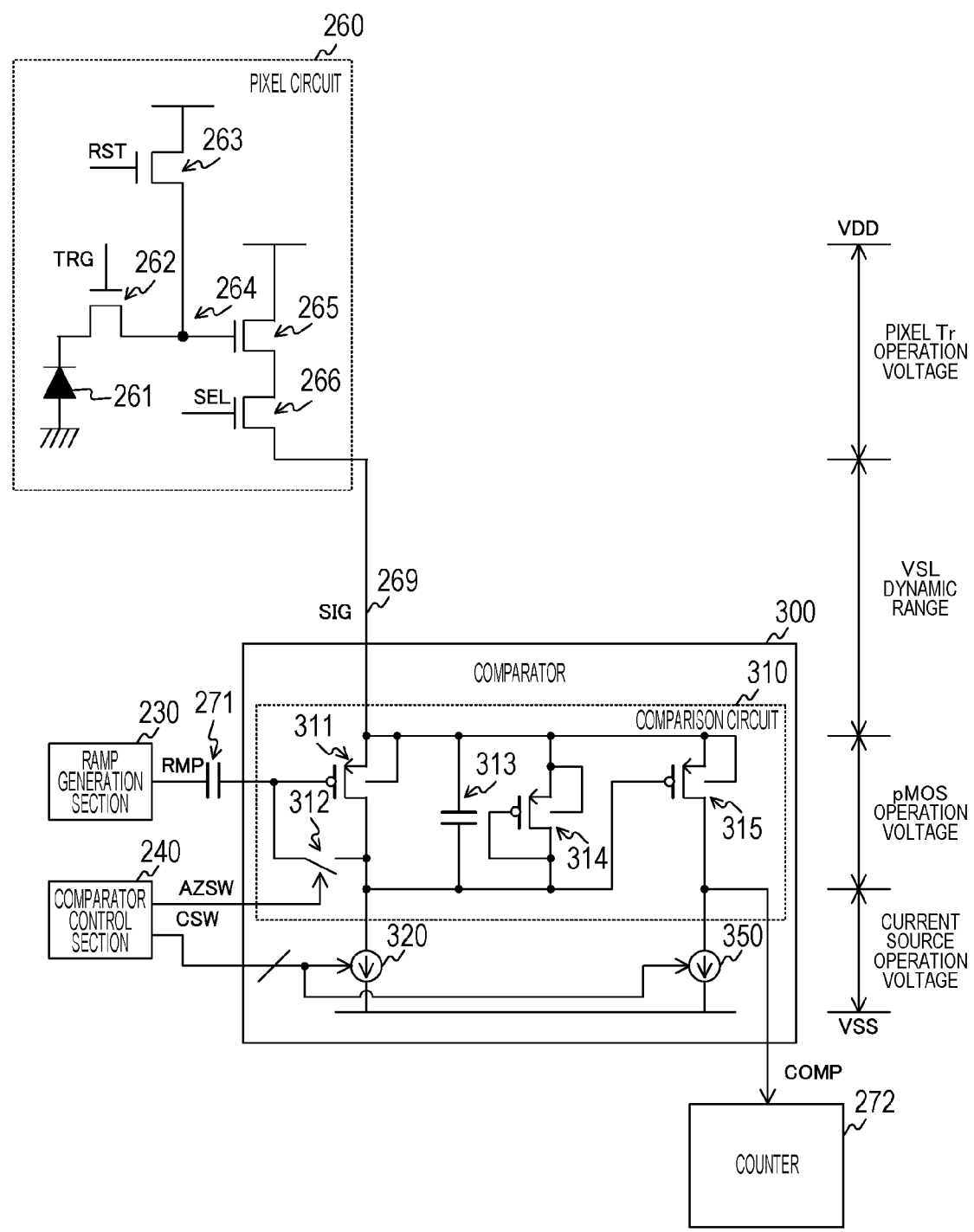
FIG. 7 is a diagram for explaining control of a dynamic range according to the first embodiment of the present technology.

FIG. 7 is a diagram for explaining control of the dynamic range according to the first embodiment of the present technology.

The sum of the voltages between the drain and the source of the amplification transistor 265 and the selection transistor 266 in the pixel circuit 260 when each of them is in the ON state is defined as a "pixel Tr operation voltage". An upper limit of the voltage (that is, the pixel signal SIG) of the vertical signal line 269 is a value that is lower than the power supply voltage VDD by the pixel Tr operation voltage.

Also, the voltage between the drain and the source when the input transistor 311 in the comparison circuit 310 is in the ON state is defined as a "pMOS operation voltage". The voltage between the drain and the source when the output transistor 315 is in the ON state is assumed to be substantially the same as that of the input transistor 311. The voltage between the connection node of the input transistor 311 and the intra-comparator current source 320 and a ground potential VSS is defined as a "current source operation voltage". A lower limit of the pixel signal SIG is the sum of the pMOS operation voltage and the current source operation voltage. A ratio between the upper limit and the lower limit of the pixel signal SIG will be referred to as a "VSL dynamic range".

Here, a connection node of the vertical signal line 269 and a current source outside the comparator is connected to an input terminal of the comparator in a typical comparator using a differential amplifier circuit. Therefore, in a case where the differential amplifier circuit is used, the lower limit of the pixel signal SIG is the current source operation voltage.

However, the comparison circuit 310 is inserted between the vertical signal line 269 and the intra-comparator current source 320 or the like in the comparator 300. Therefore, the lower limit of the pixel signal SIG becomes higher and the VSL dynamic range becomes narrower, by the amount corresponding to the pMOS operation voltage as compared with a case where the differential amplifier is used.

Since the current source operation voltage is inversely proportional to the conductance of the intra-comparator current sources 320 and 350, it is only necessary to increase the conductance to expand the VSL dynamic range. However, random telegraph signal (RTS) noise increases in proportion with the conductance. Here, the RTS noise is noise caused by random capturing and releasing of electrons in an interface state of a gate oxide film of the MOS transistor and varies depending on the gate width and the gate length. The RTS noise increases if the gate width and the gate length are adjusted such that the conductance increases.

The level of the RTS noise needs to be equal to or less than a predetermined target value, and the value is defined by a ratio for the level of random noise. In a case of a low gain, the random noise increases, and the target value of the RTS noise is thus alleviated to a value that is larger than that in a case of a high gain. On the other hand, in a case of a high gain, the random noise decreases, and the target value of the RTS noise is thus set to a value that is lower than that in the case of the low gain.

Additionally, although a low gain is set when illuminance of ambient light is high, the ratio of the signal level to the reset level increases as the illuminance increases, and it is thus necessary to expand the VSL dynamic range. On the other hand, although a high gain is set when illuminance of ambient light is low, the ratio of the signal to the reset level decreases as the illuminance decreases, and the VSL dynamic range may be relatively narrow.

In consideration of the above matters, the comparator control section 240 increases the conductance of the intra-comparator current sources 320 and 350 as compared with that at the time of the high gain in a case when the low gain is set by setting data. It is thus possible to expand the VSL dynamic range. Although the RTS noise increases due to an increase in conductance, the target value of the RTS noise is alleviated in the case of a low gain as described above, and no problem thus occurs.

On the other hand, in a case where a high gain is set by setting data, the comparator control section 240 reduces the conductance of the intra-comparator current sources 320 and 350 as compared with that at the time of a low gain. It is thus possible to reduce the RTS noise. Although the VSL dynamic range becomes narrow due to a decrease in conductance, illuminance is low and the ratio of the signal level with respect to the reset level is low at the time of the low gain as described above, and no problem thus occurs.

In short, the intra-comparator current sources 320 and 350 generate a constant current. The pixel circuit 260 generates a pixel signal SIG, and the lower limit voltage thereof is a value in accordance with the conductance. The comparison circuit 310 amplifies the pixel signal SIG with the analog gain and compares the amplified pixel signal SIG with a reference signal RMP. The comparator control section 240 reduces the conductance of the intra-comparator current sources 320 and 350 as the analog gain increases. The counter 272 counts count values in a period of time until the comparison result COMP is inverted and outputs the count values.

It is possible to expand the VSL dynamic range at the time of the low gain and to reduce the RTS noise at the time of the high gain through control of the conductance. It is thus possible to improve image quality of image data.

Note that the comparator control section 240 is an example of the control section described in the claims. Also, the intra-comparator current sources 320 and 350 are an example of the current source described in the claims.

Note that although the comparator control section 240 uses the same boundary values of the analog gain for switching conductance of each of the intra-comparator current sources 320 and 350, the present technology is not limited thereto. It is also possible to use different boundary values of the analog gain when switching is performed between the intra-comparator current source 320 and the intra-comparator current source 350.

FIG. 8 is a diagram for explaining control of conductance according to the first embodiment of the present technology. In a case where the illuminance of ambient light is higher than a predetermined value, a low gain that is equal to or lower than the boundary value is set by the DSP circuit 120 or the like. In this case, the comparator control section 240 makes the conductance of the current source 320 and the like in the comparator larger than that in the case of high gain. In response to the increase in conductance, the VSL dynamic range is widened, and the level of the RTS noise increases.

On the other hand, in a case where the illuminance of the ambient light is equal to or less than the predetermined value, a high gain that exceeds the boundary value is set by the DSP circuit 120 or the like. In this case, the comparator control section 240 sets conductance of the intra-comparator current source 320 or the like to be lower than that at the time of the low gain. In response to the decrease in conductance, the VSL dynamic range is narrowed, and the level of the RTS noise decreases.

[Intra-Comparator Current Source]

Figure 9:
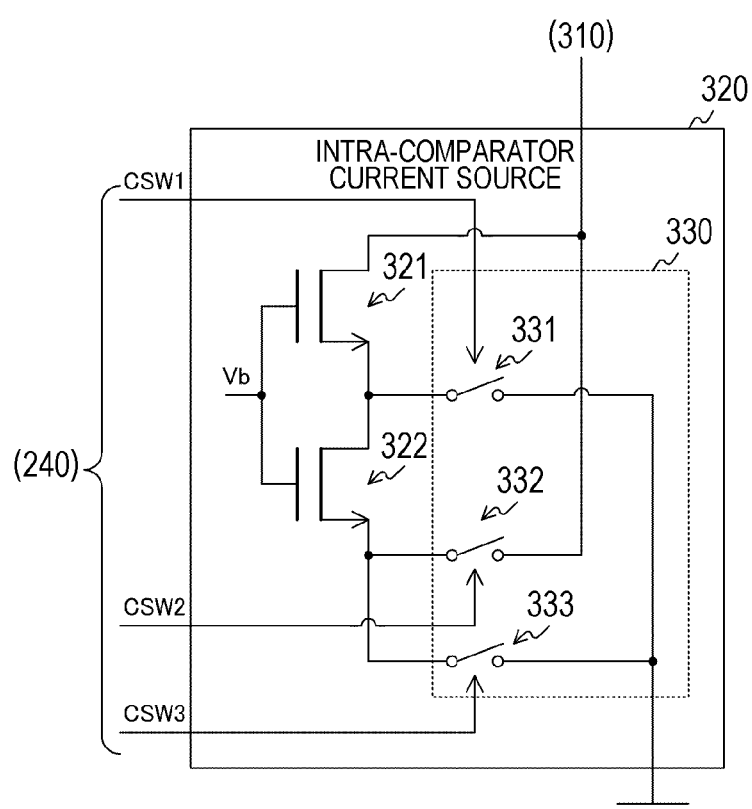
FIG. 9 is a circuit diagram illustrating a configuration example of an intra-comparator current source according to the first embodiment of the present technology.

FIG. 9 is a circuit diagram illustrating a configuration example of the intra-comparator current source 320 according to the first embodiment of the present technology. The intra-comparator current source 320 includes current source transistors 321 and 322 and a switching circuit 330. As these current source transistors 321 and 322, n-channel MOS (nMOS) transistors, for example, are used.

The switching circuit 330 is adapted to switch a connection mode of the current source transistors 321 and 322 in accordance with a switching signal CSW from the comparator control section 240. The switching signal CSW is a signal including switching signals CSW1, CSW2, and CSW3. The switching circuit 330 includes switches 331, 332, and 333. As these switches, nMOS transistors, for example, are used. The sizes (the gate widths and the gate lengths) of the nMOS transistors used as these switches may be smaller as compared with the current source transistors 321 and 322. Therefore, the arrangement of the switches has a small influence on the installation area of the intra-comparator current source 320.

The current source transistors 321 and 322 are connected in series to the comparison circuit 310, and a predetermined bias voltage Vb is applied to the gates thereof. Note that the current source transistors 321 and 322 are examples of the first and second transistors described in the claims.

The switch 331 is adapted to open and close a path between a connection node of the current source transistors 321 and 322 and a ground terminal in accordance with the switching signal CSW1. The switch 332 is adapted to open and close a path between the source of the current source transistor 322 and the comparison circuit 310 in accordance with the switching signal CSW2. The switch 333 is adapted to open and close a path between the source of the current source transistor 322 and the ground terminal in accordance with a switching signal CSW3. Either a logical value "0" or "1" is set for each of the switching signals CSW1, CSW2, and CSW3. For example, the corresponding switch is controlled to an open state when the logical value is "0", and the corresponding switch is controlled to a closed state when the logical value is "1".

Note that the configuration of an intra-comparator current source 350 is similar to that of the intra-comparator current source 320.

Figure 10A:
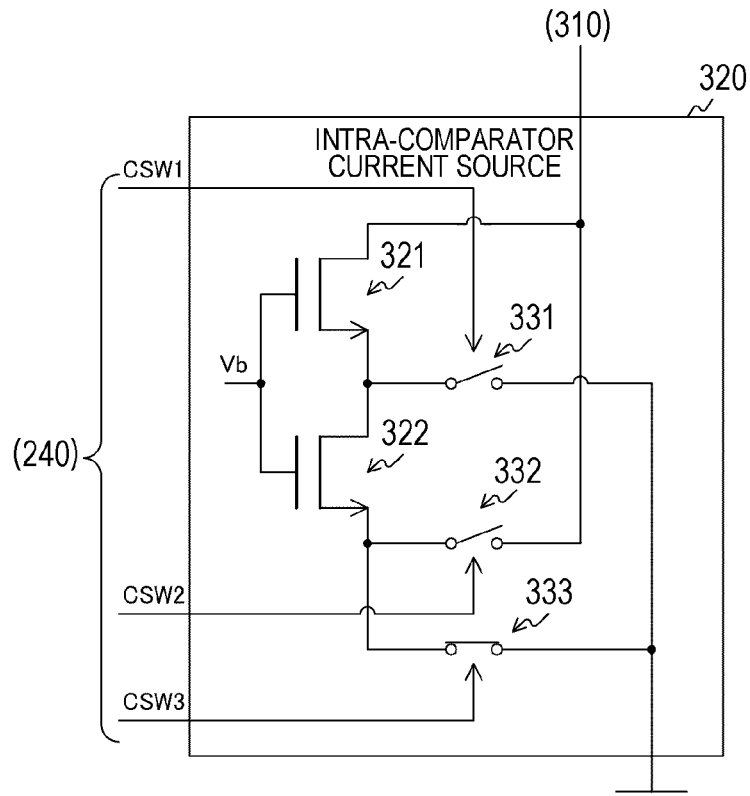
FIGS. 10A and 10B are diagrams illustrating an example of a state of the intra-comparator current source when a high gain is set according to the first embodiment of the present technology.
Figure 10B:
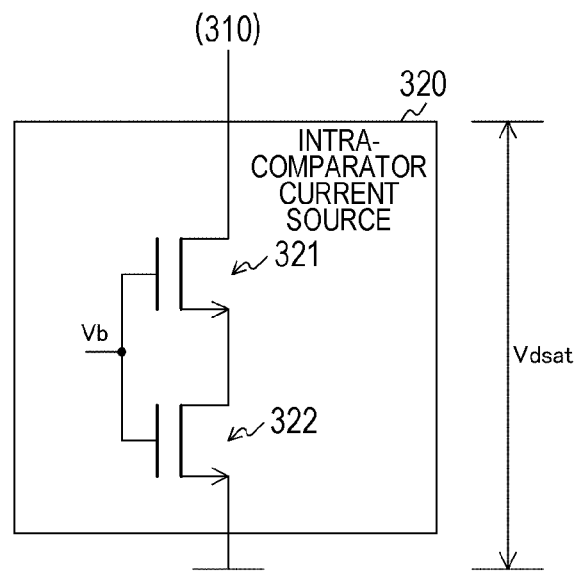

FIGS. 10A and 10B are diagrams illustrating an example of a state of the intra-comparator current source 320 when a high gain is set according to the first embodiment of the present technology. FIG. 10A illustrates an example of a state of switches when a high gain is set. FIG. 10B illustrates an example of a connection mode when the high gain is set.

As illustrated as an example in FIG. 10A, the comparator control section 240 brings the switches 331 and 332 into an open state and brings the switch 333 into a closed state when the high gain is set. In this manner, the source of the current source transistor 322 is connected to the ground terminal. As a result, the current source transistors 321 and 322 are connected in series to the comparison circuit 310 as illustrated as an example in FIG. 10B.

The gate width of each of the current source transistors 321 and 322 is defined as $W_0$, and the gate length thereof is defined as $0.5\ L_0$. Also, each transconductance is defined as $2\ gm_0$, and the operation voltage is defined as 0.5 Vdsat. The effective value of the gate width at the time of serial connection is left as $W_0$, and the effective value of the gate length becomes $L_0$. Combined conductance is proportional to (gate width)/(gate length) and thus becomes $gm_0$ which is a half of the conductance of the current source transistor alone due to the serial connection. Also, since the conductance becomes a half, the current source operation voltage becomes Vdsat which is double the operation voltage of the current source transistor alone.

Note that although the sizes (that is, the gate widths and the gate lengths) of the current source transistors 321 and 322 are set to be the same, these may be different from each other. Also, the circuit configuration of the intra-comparator current source 320 is not limited to the example illustrated in the drawing as long as it is possible to switch the connection configuration of the current source transistors.

Figure 11A:
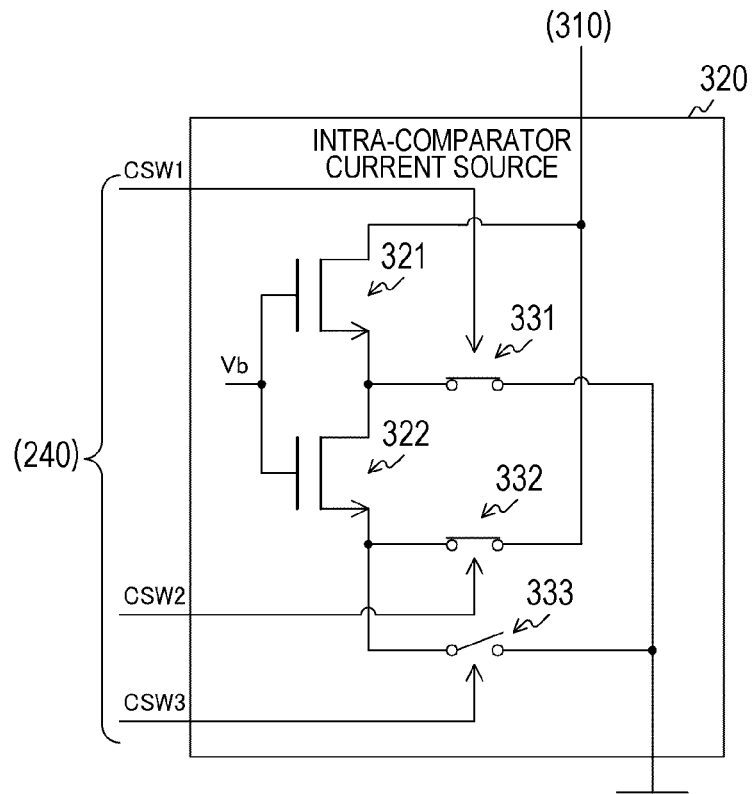
FIGS. 11A and 11B are diagrams illustrating an example of a state of the intra-comparator current source when a low gain is set according to the first embodiment of the present technology.
Figure 11B:
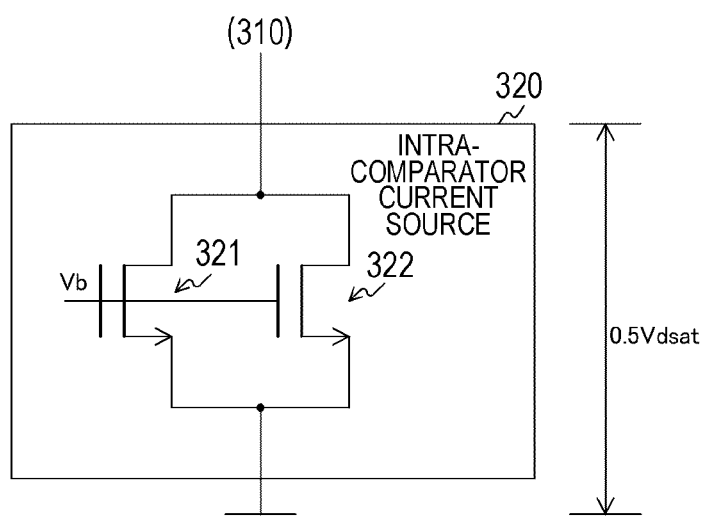

FIGS. 11A and 11B are diagrams illustrating an example of a state of the intra-comparator current source 320 when a low gain is set according to the first embodiment of the present technology. FIG. 11A illustrates an example of a state of switches when a low gain is set. FIG. 11B illustrates an example of a connection mode when the low gain is set.

As illustrated as an example in FIG. 11A, the comparator control section 240 brings the switches 331 and 332 into a closed state and brings the switch 333 into an open state when the low gain is set. In this manner, the connection node of the current source transistors 321 and 322 is connected to the ground terminal, and the source of the current source transistor 322 is connected to the comparison circuit 310. As a result, the current source transistors 321 and 322 are connected in parallel with the comparison circuit 310 as illustrated as an example in FIG. 11B.

The effective value of the gate width at the time of parallel connection is $2\ W_0$, and the effective value of the gate length becomes $0.5\ L_0$. The combined conductance is $2\ gm_0$, which is the same as that in the case of the current source transistor alone, due to parallel connection. Also, the current source operation voltage is 0.5 Vdsat, which is the same as the operation voltage of the current source transistor alone.

Here, in order to prevent the amount of current from varying before and after switching, different bias voltages Vb are preferably applied in the case of the parallel connection and in the case of the serial connection. In the case of the serial connection, for example, a voltage that is double the voltage in the case of the parallel connection is applied as the bias voltage Vb.

As illustrated in FIGS. 10A, 10B, 11A, and 11B, the comparator control section 240 controls conductance of the intra-comparator current source 320 by switching a connection mode of the current source transistors 321 and 322 in the intra-comparator current source 320.

Here, a configuration in which only one current source transistor is provided in the intra-comparator current source 320 is assumed as a comparative example. In order to set the VSL dynamic range in accordance with a high gain, the transconductance of the current source transistor has to be set to $2\ gm_0$. Furthermore, in order to achieve the target value of the RTS noise at the time of low gain while setting the transconductance to $2\ gm_0$, it is necessary to set the gate area to $2 \times W_0 \times L_0$. In order to satisfy these conditions, the gate width is adjusted to $2 \cdot 2^{1/2}\ W_0$, and the gate length is adjusted to $(\frac{1}{2}) \cdot 2^{1/2}\ L_0$, for example.

On the other hand, in the configuration in which the connection mode is switched, the sum of the gate areas of the current source transistors 321 and 322 may be $W_0 \times L_0$ as described above, and it is possible to reduce the installation area than that in the comparative example.

[Operation Example of Solid State Imaging Element]

Figure 12:
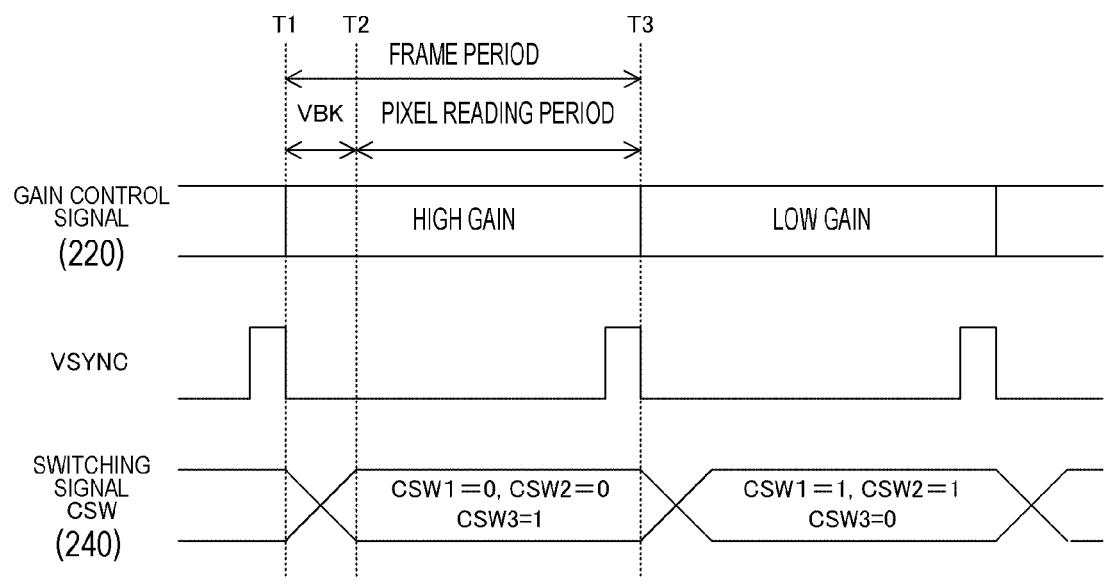
FIG. 12 is a timing chart illustrating an example of operations of the solid state imaging element according to the first embodiment of the present technology.

FIG. 12 is a timing chart illustrating an example of operations of the solid state imaging element 200 according to the first embodiment of the present technology.

Image data (frames) is captured in synchronization with the vertical synchronization signal VSYNC. Then, an analog gain is set in accordance with illuminance for each frame. For example, a control signal CTRL to set a high gain is output from the gain control section 220 in a frame period from a timing T1 at which the vertical synchronization signal VSYNC falls to a timing T3 which is the timing of next falling. After the timing T3, the gain is switched to a low gain.

Also, a period from the timing T1 to T2 in the frame period is set to a vertical blanking period VBK. In a pixel reading period from the timing T2 to T3 after elapse of the period, the pixel signal is AD-converted for each row.

In the vertical blanking period VBK, the comparator control section 240 switches the connection mode using the switching signal CSW. Since the high gain is set at the timing T1, the comparator control section 240 sets the switching signals CSW1 and CSW2 to the logical value "0", sets the switching signal CSW3 to the logical value "1", and switches the connection mode inside the intra-comparator current source 320 or the like to serial connection. Also, since the low gain is set at the timing T3, the comparator control section 240 sets the switching signals CSW1 and CSW2 to the logical value "1", sets the switching signal CSW3 to the logical value "0", and switches the connection mode inside the intra-comparator current source 320 or the like to the parallel connection.

As described above, according to the first embodiment of the present technology, the comparator control section 240 reduces conductance of the intra-comparator current source 320 in a case where the analog gain (amplification rate) is high, and it is thus possible to curb the RTS noise. Also, in a case where the analog gain is low, the comparator control section 240 increases the conductance of the intra-comparator current source 320, and it is thus possible to expand the dynamic range. In other words, it is possible to improve image quality of image data through expansion of the VSL dynamic range when the analog gain is low and curbing of the RTS noise when the analog gain is high.

2. Second Embodiment

Although the comparator control section 240 controls the conductance of the intra-comparator current source 320 and the like in two stages in the aforementioned first embodiment, there may be a case where the adjustment range of the current source operation voltage lacks in the control in the two stages. A comparator control section 240 according to a second embodiment is different from that in the first embodiment in that the conductance of the intra-comparator current source 320 and the like is controlled in three stages.

Figure 13:
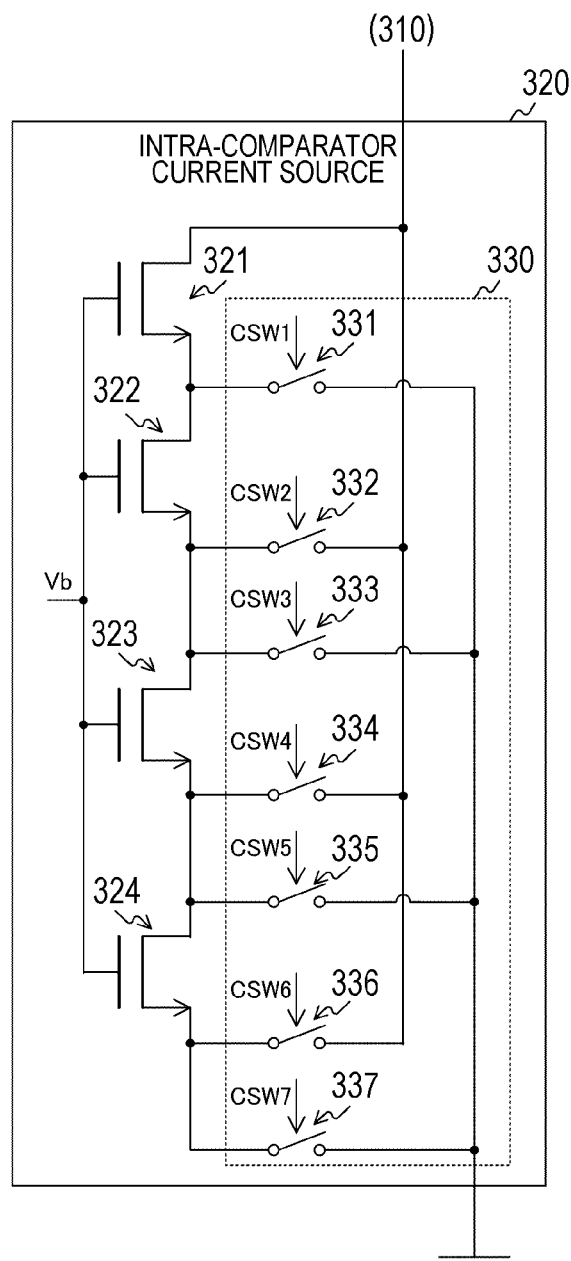
FIG. 13 is a circuit diagram illustrating a configuration example of an intra-comparator current source according to a second embodiment of the present technology.

FIG. 13 is a circuit diagram illustrating a configuration example of the intra-comparator current source 320 according to the second embodiment of the present technology. The intra-comparator current source 320 in the second embodiment is different from that in the first embodiment in that the intra-comparator current source 320 further includes current source transistors 323 and 324 and switches 334 to 337 are further included in a switching circuit 330. As the current source transistors 323 and 324, nMOS transistors, for example, are used.

The current source transistors 323 and 324 are connected in series to a current source transistor 322. Also, a bias voltage Vb is applied to gates of the current source transistors 323 and 324. Note that the current source transistors 323 and 324 are examples of the third and fourth transistors described in the claims.

The switch 334 is adapted to open and close a path between a connection node of the current source transistors 323 and 324 and a comparison circuit 310 in accordance with a switching signal CSW4 from a vertical drive section 210. The switch 335 is adapted to open and close a path between a connection node of the current source transistors 323 and 324 and a ground terminal in accordance with a switching signal CSW5 from the vertical drive section 210.

The switch 336 is adapted to open and close a path between a source of the current source transistor 324 and a comparison circuit 310 in accordance with a switching signal CSW6 from the vertical drive section 210. The switch 337 is adapted to open and close a path between the source of the current source transistor 324 and a ground terminal in accordance with a switching signal CSW7 from the vertical drive section 210.

Note that the configuration of an intra-comparator current source 350 is similar to that of the intra-comparator current source 320.

Figure 14:
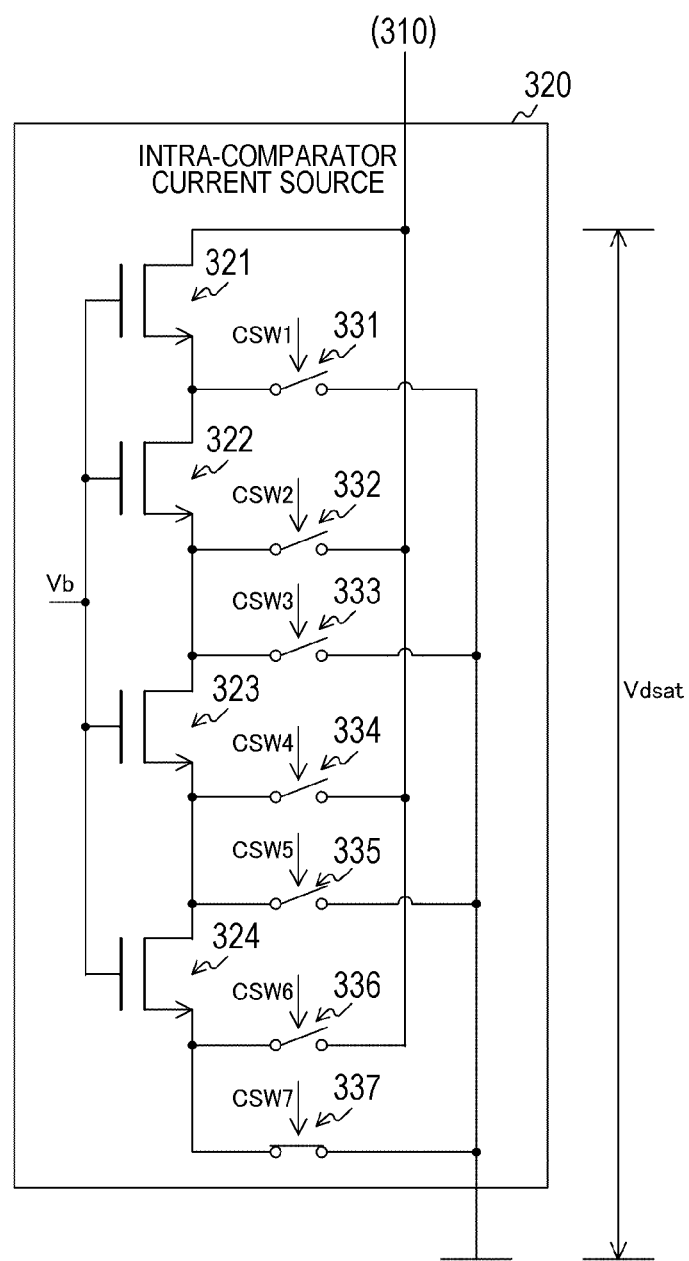
FIG. 14 is a diagram illustrating an example of a state of the intra-comparator current source when a high gain is set according to the second embodiment of the present technology.

FIG. 14 is a diagram illustrating an example of a state of the intra-comparator current source 320 when a high gain is set according to the second embodiment of the present technology.

As illustrated as an example in the drawing, the comparator control section 240 brings the switch 337 into a closed state and brings the remaining switches into an open state when a high gain is set. In this manner, the source of the current source transistor 324 is connected to the ground terminal. As a result, the current source transistors 321 to 324 are connected in series to the comparison circuit 310. If a gate width of the current source transistor alone is defined as $W_0$, and a gate length is set to 0.25 $L_0$, an effective value of the gate width in the drawing is $W_0$, and an effective value of the gate length is $L_0$. The conductance is the same as that of the current source transistor alone, and the current source operation voltage is Vdsat.

Figure 15:
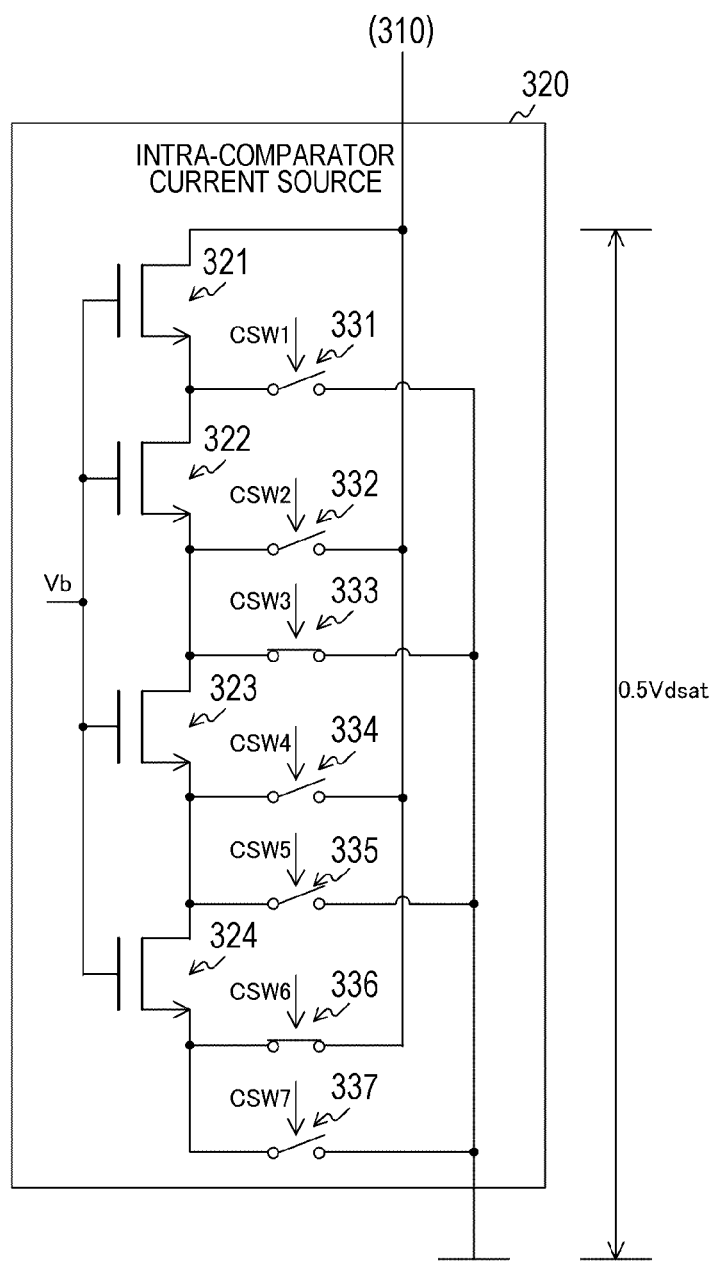
FIG. 15 is a diagram illustrating an example of a state of the intra-comparator current source when a middle gain is set according to the second embodiment of the present technology.

FIG. 15 is a diagram illustrating an example of a state of the intra-comparator current source 320 when a middle gain is set according to the second embodiment of the present technology. Here, the middle gain is a gain between a high gain and a low gain.

As illustrated as an example in the drawing, the comparator control section 240 brings the switches 333 and 336 into a closed state and brings the remaining switches into an open state when the middle gain is set. In this manner, a connection node of the current source transistors 322 and 323 is connected to the ground terminal, and the source of the current source transistor 324 is connected to the comparison circuit 310. As a result, the circuit in which the current source transistors 321 and 322 are connected in series and the circuit in which the current source transistors 323 and 324 are connected in series are connected in parallel. The effective value of the gate width in the drawing is 2 $W_0$, and the effective value of the gate length is 0.5 $L_0$. The conductance is double the conductance of the current source transistor alone, and the current source operation voltage is 0.5 Vdsat.

Figure 16:
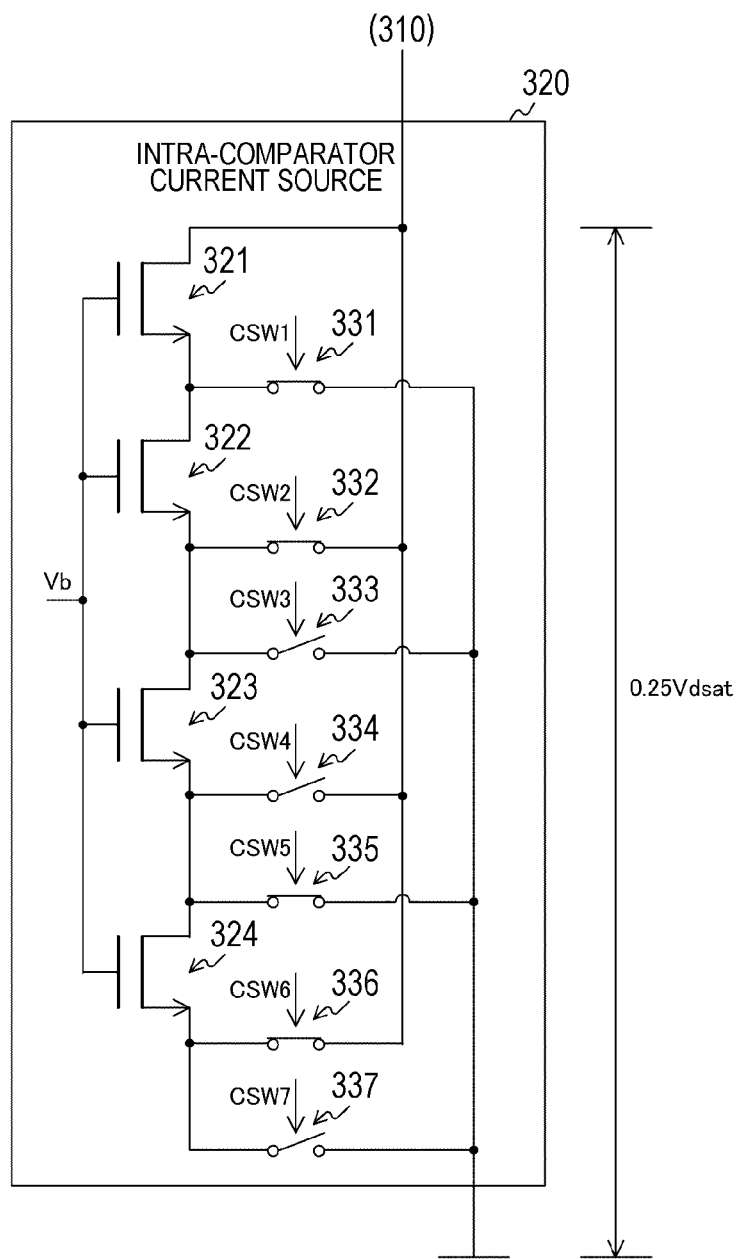
FIG. 16 is a diagram illustrating an example of a state of the intra-comparator current source when a low gain is set according to the second embodiment of the present technology.

FIG. 16 is a diagram illustrating an example of a state of the intra-comparator current source 320 when a low gain is set according to the second embodiment of the present technology.

As illustrated as an example in the drawing, the comparator control section 240 brings the switches 331, 332, 335, and 336 into a closed state and brings the remaining switches into an open state when the low gain is set. In this manner, a connection node of the current source transistors 321 and 322 and a connection node of the current source transistors 323 and 324 are connected to the ground terminal. Also, a connection node of the current source transistors 322 and 323 and the source of the current source transistor 324 are connected to the comparison circuit 310. As a result, the current source transistors 321 to 324 are connected in parallel. The effective value of the gate width in the drawing is 4 $W_0$, and the effective value of the gate length is 0.25 $L_0$. The conductance is four times as large as the conductance of the current source transistor alone, and the current source operation voltage is 0.25 Vdsat.

As illustrated in FIGS. 14 to 16, the comparator control section 240 can control the conductance of the intra-comparator current source 320 in three stages through switching of the connection mode. It is thus possible to expand the adjustment range of the current source operation voltage as compared with a case where control is performed in two stages. It is possible to reduce noise to the maximum extent while securing a necessary VSL dynamic range by setting an appropriate current source operation voltage in accordance with the analog gain. For example, the VSL dynamic range when the analog gain is 6 decibels (dB) is only required to be a half of the VSL dynamic range when the analog gain is 0 decibels (dB), and it is possible to further reduce noise by switching the reduced amount to the current source operation voltage.

Note that although the sizes (that is, the gate widths and the gate lengths) of the current source transistors 321 to 324 are set to be the same, these may be different from each other. It is possible to finely adjust the current source operation voltage by combinations of transistors with different sizes. Also, although the current source operation voltage is controlled in three stages, it can also be controlled in four or more stages by adding current source transistors and switches.

As described above, according to the second embodiment of the present technology, the number of current source transistors is increased to four, the comparator control section 240 switches the connection mode thereof, and it is thus possible to control the current source operation voltage in three stages. Therefore, it is possible to control the VSL dynamic range and the RTS noise to more appropriate values as compared with the case where the current source operation voltage is controlled in two stages.

3. Third Embodiment

In the aforementioned first embodiment, the switches 332 and 332 switch the connection destination of the source of the current source transistor 322 to either a power source side or the ground side. In this configuration, the connection destinations of the drain and the source of the current source transistor 322 are inverted from the power source side and the ground side to the ground side and the power source side at the time of switching, and there is thus a concern that a surge current may flow via the transistor. An intra-comparator current source 320 in a third embodiment is different from that in the first embodiment in that the surge current is curbed.

Figure 17:
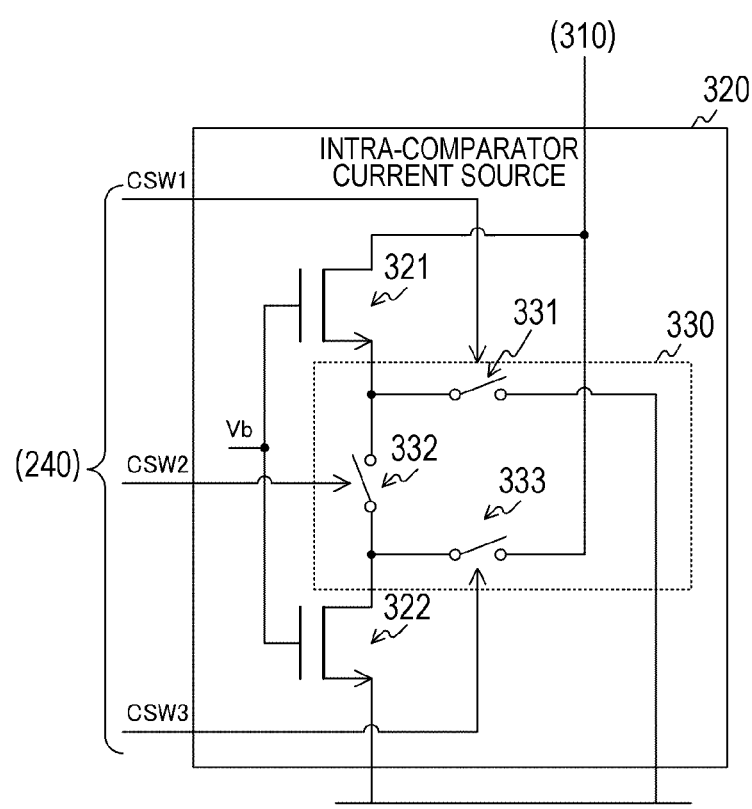
FIG. 17 is a circuit diagram illustrating a configuration example of an intra-comparator current source according to a third embodiment of the present technology.

FIG. 17 is a circuit diagram illustrating a configuration example of the intra-comparator current source 320 according to the third embodiment of the present technology. In the intra-comparator current source 320 in the third embodiment, a drain of a current source transistor 321 is connected to a comparison circuit 310, and a source of a current source transistor 322 is connected to a ground terminal, similarly to the first embodiment.

However, a switch 331 in the third embodiment opens and closes a path between a source of the current source transistor 321 and the ground terminal. Also, a switch 332 in the third embodiment opens and closes a path between the source of the current source transistor 321 and a drain of the current source transistor 322. Additionally, a switch 333 in the third embodiment opens and closes a path between the drain of the current source transistor 322 and the comparison circuit 310.

Note that the configuration of an intra-comparator current source 350 is similar to that of the intra-comparator current source 320.

Figure 18:
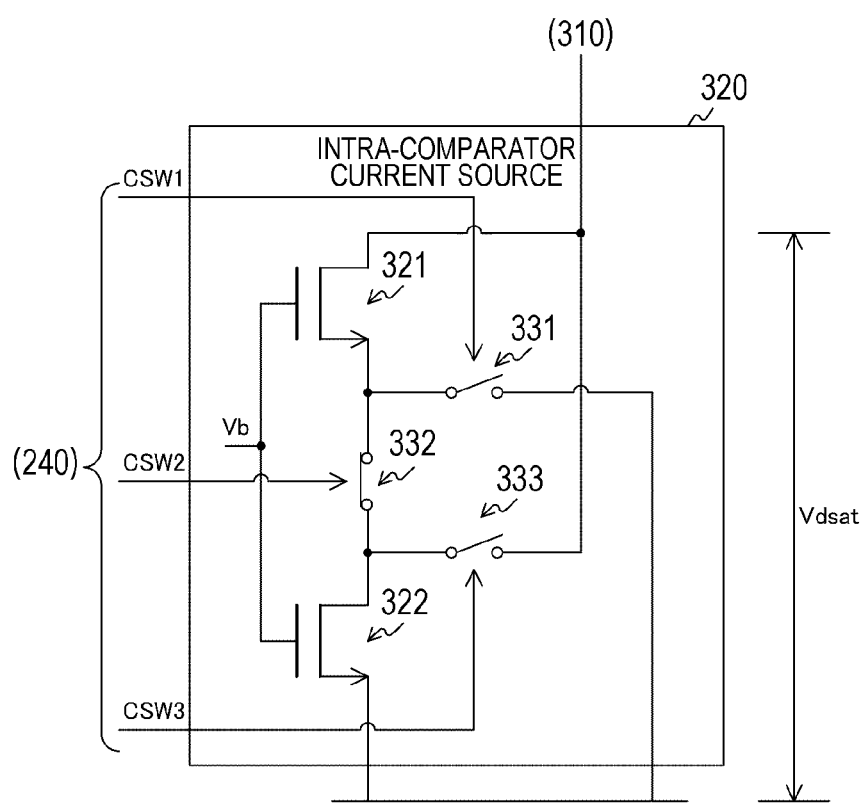
FIG. 18 is a diagram illustrating an example of a state of the intra-comparator current source when a high gain is set according to the third embodiment of the present technology.

FIG. 18 is a diagram illustrating an example of a state of the intra-comparator current source 320 when a high gain is set according to the third embodiment of the present technology.

When a high gain is set as illustrated as an example in the drawing, a comparator control section 240 brings the switches 331 and 333 into an open state and brings the switch 332 into a closed state. In this manner, the source of the current source transistor 321 and the drain of the current source transistor 322 are connected. As a result, the current source transistors 321 and 322 are connected in series to the comparison circuit 310. Also, a current source operation voltage becomes Vdsat similarly to the first embodiment.

Figure 19:
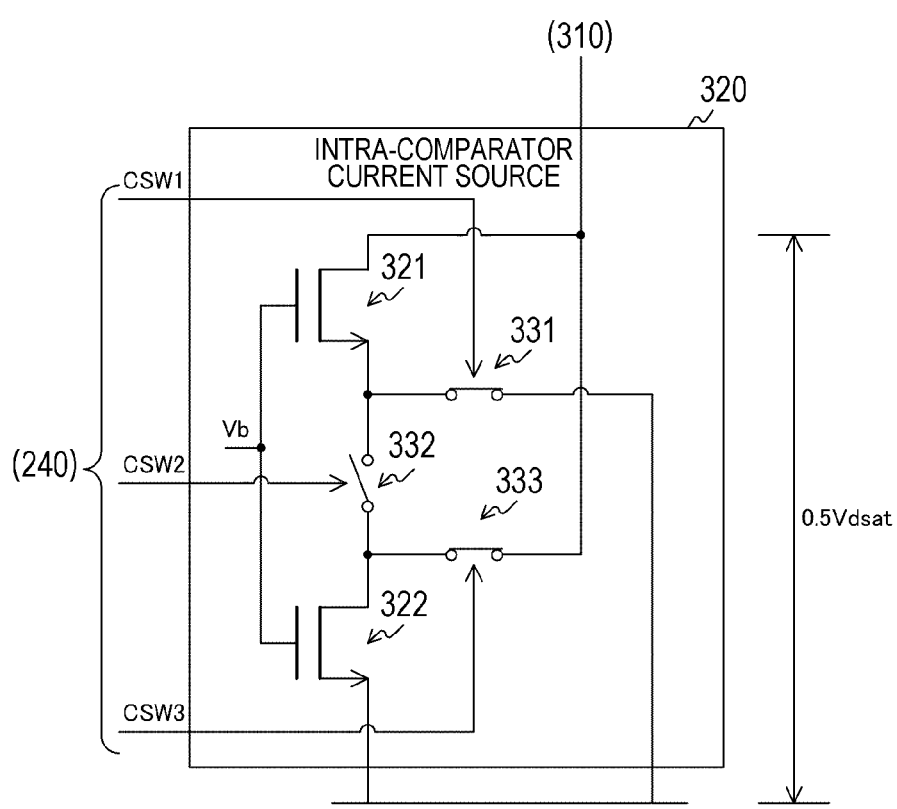
FIG. 19 is a diagram illustrating an example of a state of the intra-comparator current source when a low gain is set according to the third embodiment of the present technology.

FIG. 19 is a diagram illustrating an example of a state of the intra-comparator current source 320 when a low gain is set according to the third embodiment of the present technology.

When a low gain is set as illustrated as an example in the drawing, the comparator control section 240 brings the switch 332 into an open state and brings the switches 331 and 333 into a closed state. In this manner, the source of the current source transistor 321 and the ground terminal are connected, and the drain of the current source transistor 322 and the comparison circuit 310 are connected. As a result, the current source transistors 321 and 322 are connected in parallel with the comparison circuit 310. Also, a current source operation voltage becomes 0.5 Vdsat similarly to the first embodiment.

As illustrated as examples in FIGS. 18 and 19, the connection destinations of the drain and the source of the current source transistor 322 are fixed to the power source side and the ground side at the time of switching, and the connection destinations of the drain and the source are thus not inverted from the power source side and the ground side to the ground side and the power source side at the time of switching. It is thus possible to curb flowing of the surge current via the transistor. The same applies to the current source transistor 321 as well.

In this manner, according to the third embodiment of the present technology, the connection destinations of the drain and the source of the current source transistor 322 are fixed to the power source side and the ground side, and the connection destinations of the drain and the source are thus not inverted from the power source side and the ground side to the ground side and the power source side at the time of the switching. It is thus possible to curb flowing of the surge current via the current source transistor 322.

Modification Example

Although the comparator control section 240 controls the conductance of the intra-comparator current source 320 and the like in two stages in the aforementioned third embodiment, there may be a case where the adjustment range of the current source operation voltage lacks in the control in the two stages. A comparator control section 240 according to a modification example of the third embodiment is different from that in the third embodiment in that the conductance of the intra-comparator current source 320 and the like is controlled in three stages.

Figure 20:
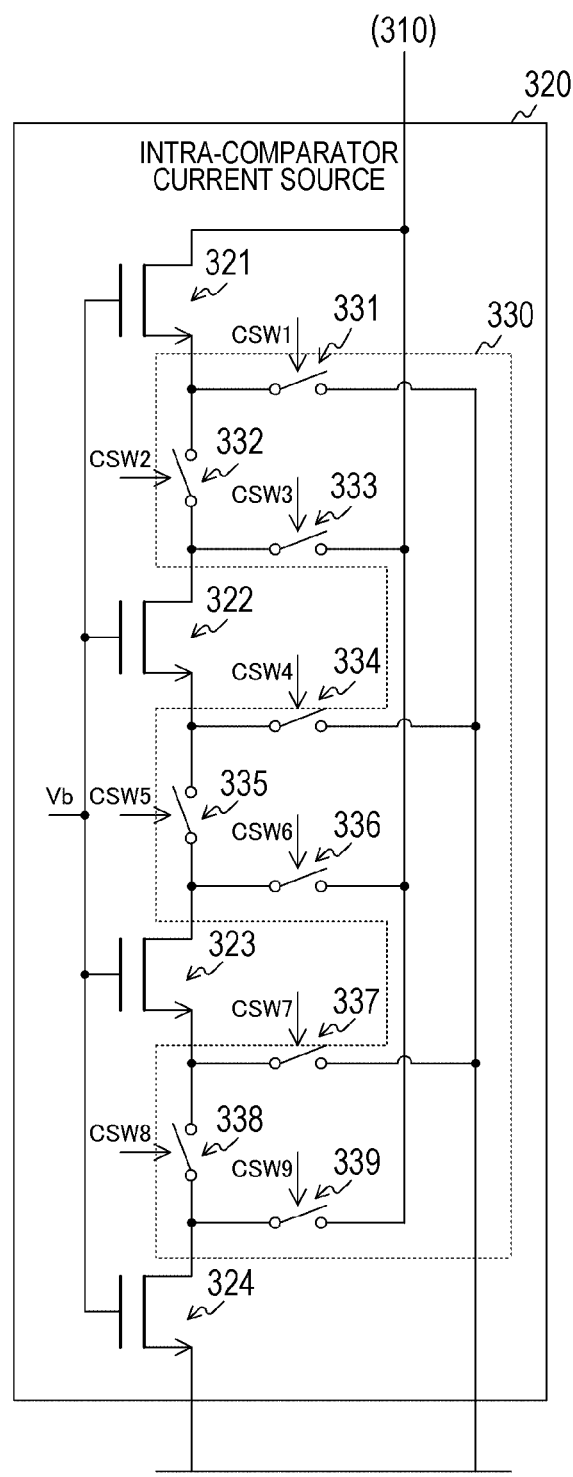
FIG. 20 is a circuit diagram illustrating a configuration example of an intra-comparator current source according to a modification example of the third embodiment of the present technology.

FIG. 20 is a circuit diagram illustrating a configuration example of an intra-comparator current source 320 according to the modification example of the third embodiment of the present technology. The intra-comparator current source 320 in the modification example of the third embodiment is different from that in the first embodiment in that the intra-comparator current source 320 further includes current source transistors 323 and 324 and switches 334 to 339 are further included in a switching circuit 330.

Connection configurations between the current source transistors 321 and 322 and the switches 331 to 333 in the modification example of the third embodiment are similar to those in the third embodiment.

The switch 334 is adapted to open and close a path between a source of the current source transistor 322 and a ground terminal in accordance with a switching signal CSW4. The switch 335 is adapted to open and close a path between the source of the current source transistor 322 and a drain of the current source transistor 323 in accordance with a switching signal CSW5. The switch 336 is adapted to open and close a path between the drain of the current source transistor 323 and a comparison circuit 310 in accordance with a switching signal CSW6.

The switch 337 is adapted to open and close a path between a source of the current source transistor 323 and the ground terminal in accordance with a switching signal CSW7. The switch 338 is adapted to open and close a path between the source of the current source transistor 323 and a drain of the current source transistor 324 in accordance with a switching signal CSW8 from a vertical drive section 210. The switch 339 is adapted to open and close a path between the drain of the current source transistor 324 and the comparison circuit 310 in accordance with a switching signal CSW9 from the vertical drive section 210. A source of the current source transistor 324 is connected to the ground terminal.

Note that the configuration of an intra-comparator current source 350 is similar to that of the intra-comparator current source 320.

Figure 21:
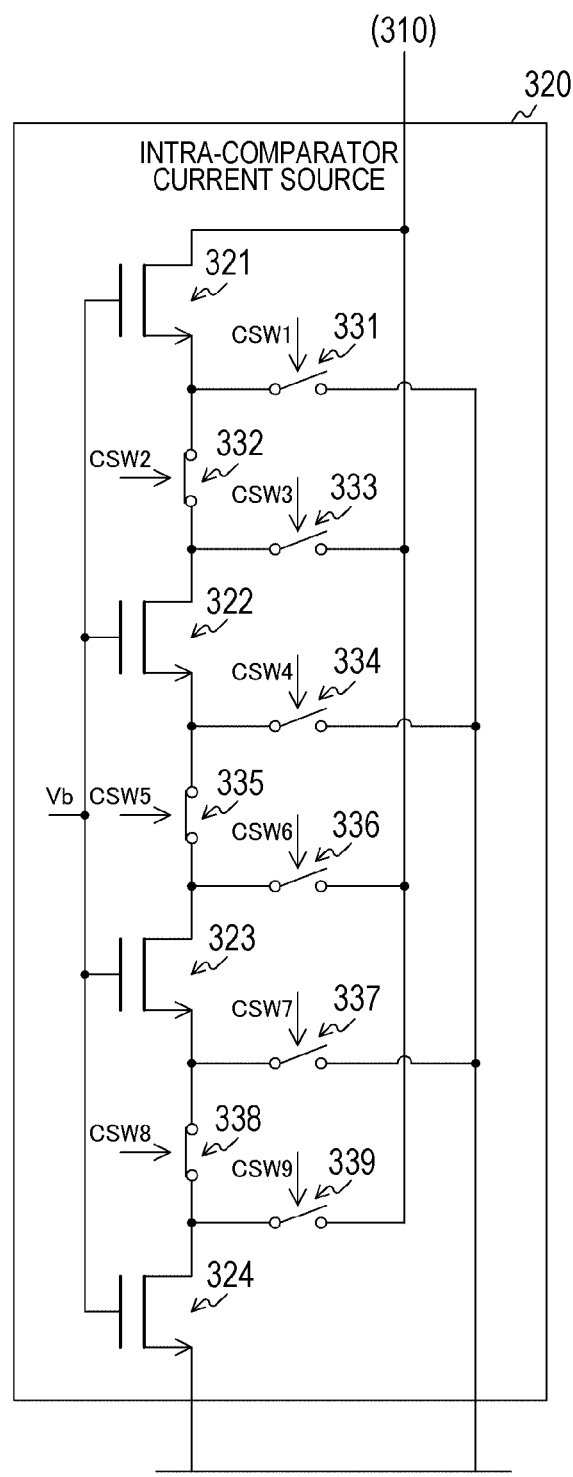
FIG. 21 is a diagram illustrating an example of a state of the intra-comparator current source when a high gain is set according to the modification example of the third embodiment of the present technology.

FIG. 21 is a diagram illustrating an example of a state of the intra-comparator current source 320 when a high gain is set according to the modification example of the third embodiment of the present technology.

As illustrated as an example in the drawing, the comparator control section 240 brings the switches 332, 335, and 338 into a closed state and brings the remaining switches into an open state when the high gain is set. In this manner, the source of the current source transistor 321 and the drain of the current source transistor 322 are connected, and the source of the current source transistor 322 and the drain of the current source transistor 323 are connected. Also, the source of the current source transistor 323 and the drain of the current source transistor 324 are connected. As a result, the current source transistors 321 to 324 are connected in series to the comparison circuit 310.

Figure 22:
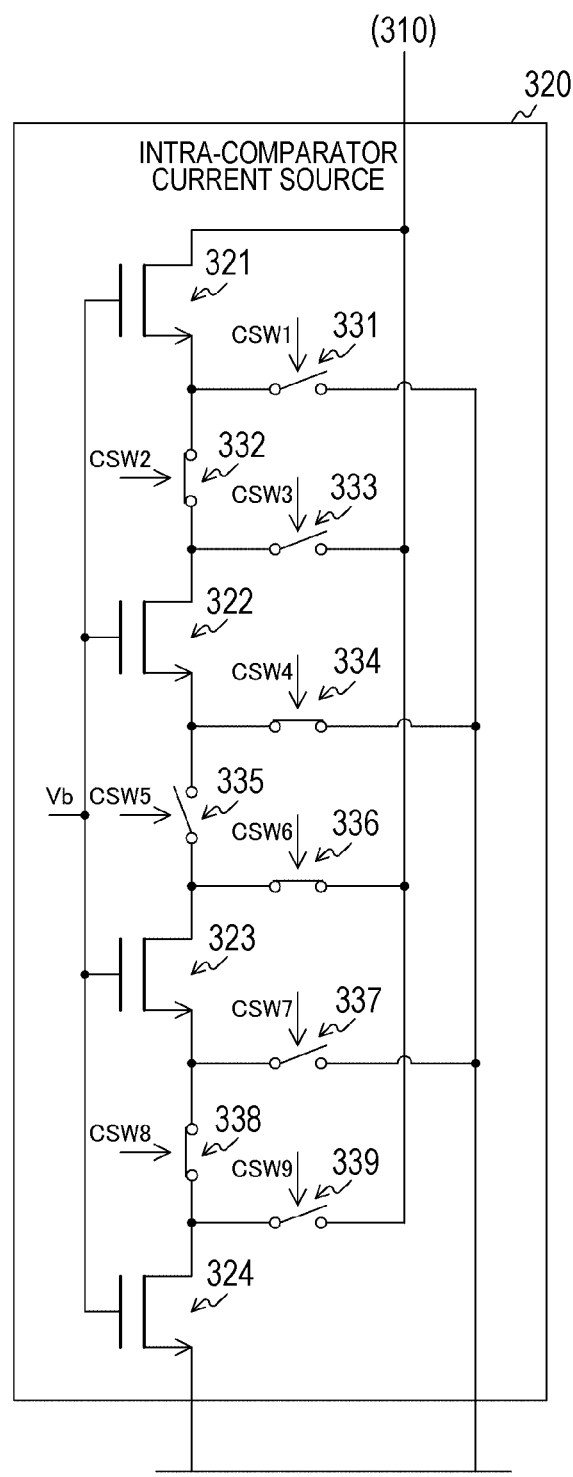
FIG. 22 is a diagram illustrating an example of a state of the intra-comparator current source when a middle gain is set according to the modification example of the third embodiment of the present technology.

FIG. 22 is a diagram illustrating an example of a state of the intra-comparator current source 320 when a middle gain is set according to the modification example of the third embodiment of the present technology.

As illustrated as an example in the drawing, the comparator control section 240 brings the switches 332, 334, 336, and 338 into a closed state and brings the remaining switches into an open state when the middle gain is set. In this manner, the source of the current source transistor 321 and the drain of the current source transistor 322 are connected, and the source of the current source transistor 322 is connected to the ground terminal. Also, the drain of the current source transistor 323 is connected to the comparison circuit 310, and the source of the current source transistor 323 is connected to the drain of the current source transistor 324. As a result, the circuit in which the current source transistors 321 and 322 are connected in series and the circuit in which the current source transistors 323 and 324 are connected in series are connected in parallel.

Figure 23:
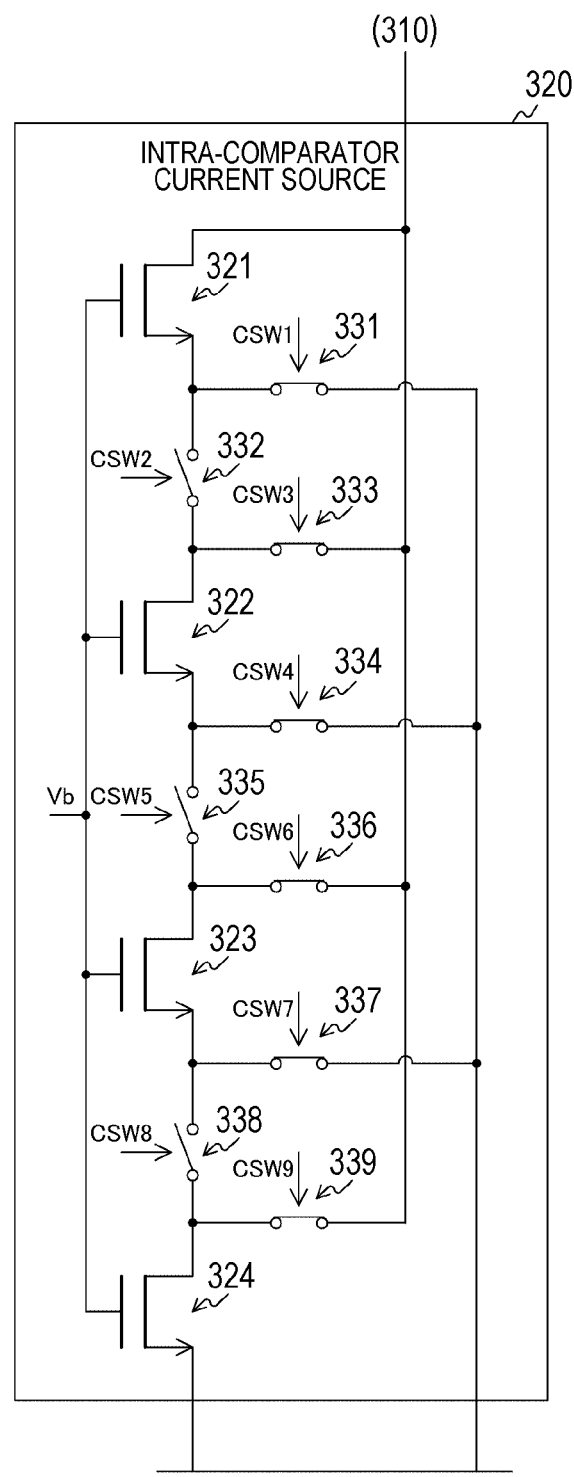
FIG. 23 is a diagram illustrating an example of a state of the intra-comparator current source when a low gain is set according to the modification example of the third embodiment of the present technology.

FIG. 23 is a diagram illustrating an example of a state of the intra-comparator current source 320 when a low gain is set according to the modification example of the third embodiment of the present technology.

As illustrated as an example in the drawing, the comparator control section 240 brings the switches 331, 333, 334, 336, 337, and 339 into a closed state and brings the remaining switches into an open state when the low gain is set. In this manner, the source of each of the current source transistors 321, 322, and 323 is connected to the ground terminal, and the drain of each of the current source transistors 322, 323, and 324 is connected to the comparison circuit 310. As a result, the current source transistors 321 to 324 are connected in parallel.

As illustrated in FIGS. 21 to 23, the comparator control section 240 can control the conductance of the intra-comparator current source 320 in three stages through switching of the connection mode. It is thus possible to expand the adjustment range of the current source operation voltage as compared with a case where control is performed in two stages. Also, the connection destinations of the drains and the sources of the current source transistors 321 to 324 are fixed to the power source side and the ground side at the time of the switching, and it is thus possible to curb the surge current.

As described above, according to the modification example of the third embodiment of the present technology, the number of current source transistors are increased to four, the connection mode thereof is switched by the comparator control section 240, and it is thus possible to control the current source operation voltage in three stages. Therefore, it is possible to control the VSL dynamic range and the RTS noise to more appropriate values as compared with the case where the current source operation voltage is controlled in two stages.

4. Fourth Embodiment

In the aforementioned first embodiment, the current source transistors 321 and 322 with the gates to which the constant bias voltage Vb is applied are disposed in the intra-comparator current source 320. However, there is a concern that if the bias voltage Vb is a fixed value in this configuration, the amount of current of the intra-comparator current source 320 may vary at the time of switching the connection mode. A solid state imaging element 200 in a fourth embodiment is different from that in the first embodiment in that the amount of current is maintained to be constant using a current mirror circuit.

Figure 24:
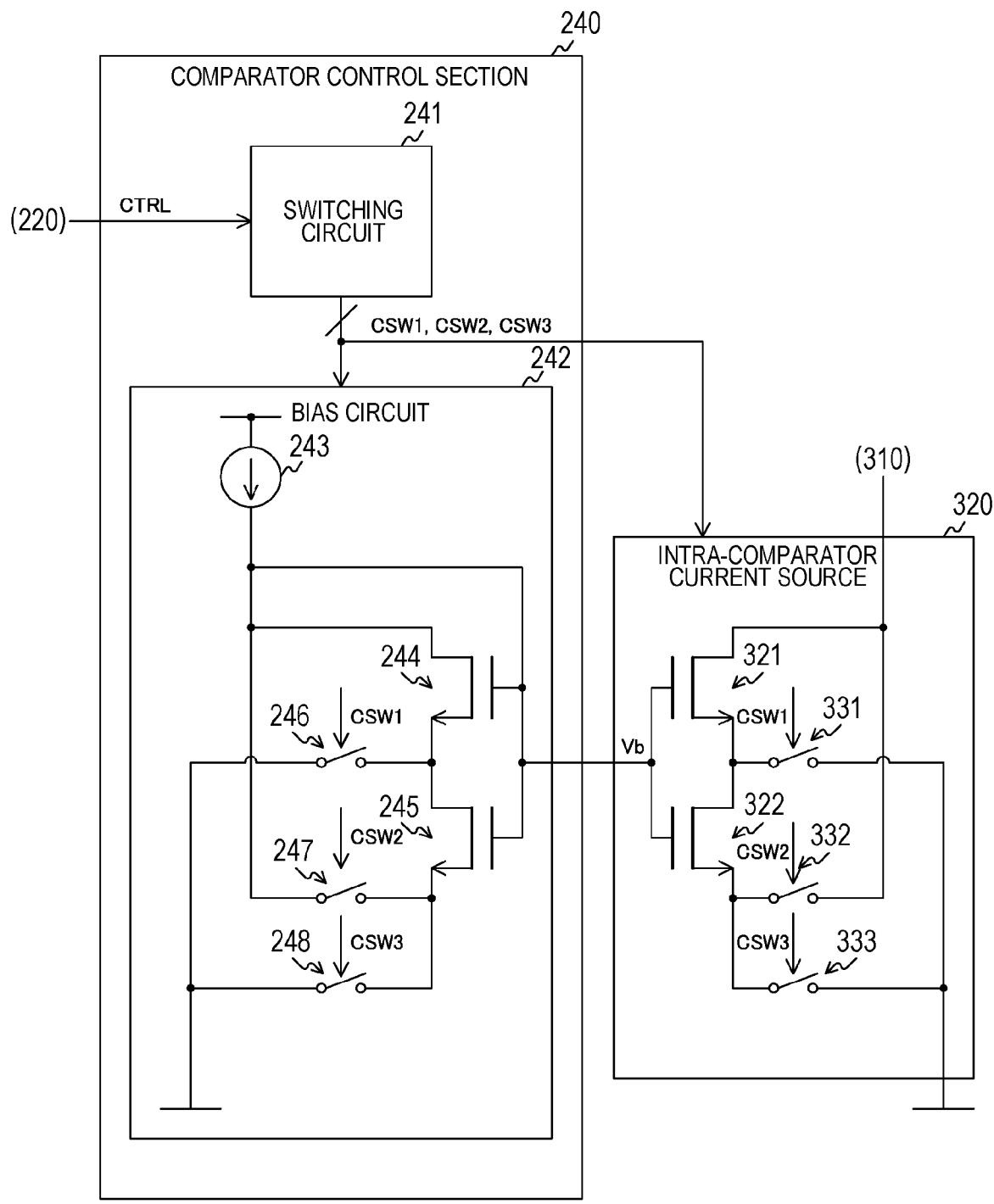
FIG. 24 is a circuit diagram illustrating a configuration example of a comparator control section according to a fourth embodiment of the present technology.

FIG. 24 is a circuit diagram illustrating a configuration example of a comparator control section 240 according to the fourth embodiment of the present technology. The comparator control section 240 in the fourth embodiment includes a switching circuit 241 and a bias circuit 242.

The switching circuit 241 is adapted to control conductance of intra-comparator current sources 320 and 350 using switching signals CSW1 to CSW3 on the basis of a control signal CTRL from a gain control section 220. Additionally, the switching signals CSW1 to CSW3 are also supplied to the bias circuit 242.

The bias circuit 242 includes a current source 243, current source transistors 244 and 245, and switches 246 to 248. As the current source transistors 244 and 245, nMOS transistors, for example, are used.

The current source 243 is adapted to supply a constant reference signal. The current source transistors 244 and 245 are connected in series to the current source 243. Also, gates of the current source transistors 244 and 245 are connected to a connection node of the current source 243 and the current source transistor 244. Additionally, a voltage of the gates of the current source transistors 244 and 245 is supplied as a bias voltage Vb to the intra-comparator current source 320 and the intra-comparator current source 350 of each column.

The switch 246 is adapted to open and close a path between a connection node of the current source transistors 244 and 245 and a ground terminal in accordance with the switching signal CSW1. The switch 247 is adapted to open and close a path between a source of the current source transistor 245 and the current source 243 in accordance with the switching signal CSW2. The switch 248 is adapted to open and close a path between the source of the current source transistor 245 and the ground terminal in accordance with the switching signal CSW3.

With the aforementioned configuration, the circuit including the bias circuit 242 and the intra-comparator current sources 320 and 350 functions as a current mirror circuit. In the current mirror circuit, a reference current in the bias circuit 242 is copied by the intra-comparator current sources 320 and 350. In this manner, it is possible to maintain the amounts of current in the intra-comparator current sources 320 and 350 to be constant before and after switching.

Note that it is also possible to apply the second and third embodiments and the modification example of the third embodiment to the fourth embodiment. In this case, it is only necessary to change the circuit configuration of the bias circuit 242 in accordance with the circuit of the intra-comparator current source 320 in the second or third embodiment or the modification example of the third embodiment.

As described above, according to the fourth embodiment of the present technology, the constant reference current in the bias circuit 242 is copied by the intra-comparator current source 320 and the like, the bias circuit 242 operates as a current mirror circuit, and it is thus possible to maintain the amounts of current in the intra-comparator current sources 320 and 350 to be constant before and after the switching.

5. Fifth Embodiment

Although the circuit outside the solid state imaging element 200 sets an analog gain in accordance with illuminance in the aforementioned first embodiment, the amount of processing in the external circuit increases in this configuration. An imaging apparatus 100 in a fifth embodiment is different from that in the first embodiment in that a solid state imaging element 200 itself sets an analog gain in accordance with illuminance.

Figure 25:
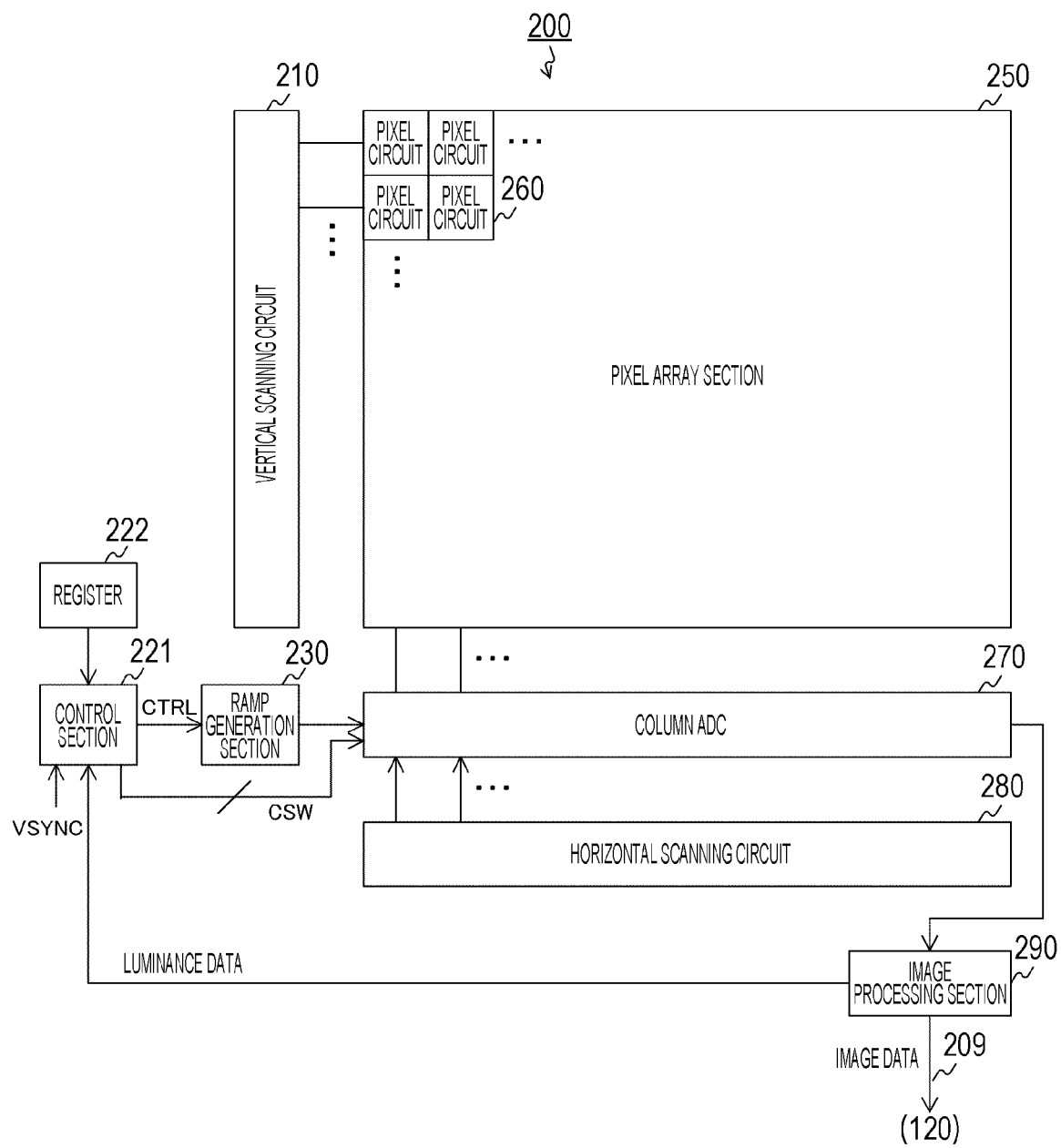
FIG. 25 is a block diagram illustrating a configuration example of a solid state imaging element according to a fifth embodiment of the present technology.

FIG. 25 is a block diagram illustrating a configuration example of the solid state imaging element 200 according to the fifth embodiment of the present technology. The solid state imaging element 200 in the fifth embodiment is different from that in the first embodiment in that the solid state imaging element 200 includes a control section 221 and a register 222 instead of the gain control section 220 and the comparator control section 240.

Also, an image processing section 290 in the fifth embodiment is different from that in the first embodiment in that illuminance is measured on the basis of image data. The image processing section 290 performs an arithmetic operation using the statistics of a pixel signal in the image data, such as an average value, and a median value, a mode, or the like as illuminance. The image processing section 290 supplies illuminance data indicating illuminance to a control section 221.

The register 222 is adapted to store setting data in association with each of a plurality of illuminance ranges. The illuminance ranges include, for example, a range of high illuminance that is higher than a predetermined value and a range of low illuminance that is equal to or less than a predetermined value. Also, the setting data includes a control signal CTRL for controlling a ramp generation section 230 and a switching signal CSW. A control signal CTRL for generating a reference signal with a large amplitude (in other words, for setting a low gain) and a switching signal CSW for establishing parallel connection are associated with the range of the high illuminance. On the other hand, a control signal CTRL for generating a reference signal with a small amplitude (in other words, for setting a high gain) and a switching signal CSW for establishing serial connection are associated with the range of the low illuminance.

The control section 221 is adapted to control the ramp generation section 230 and a comparator 300 in each column on the basis of illuminance data. The control section 221 reads the control signal CTRL and the switching signal CSW in accordance with illuminance from the register 222, supplies the control signal CTRL to the ramp generation section 230, and supplies the switching signal CSW to the comparator 300 of each column. The analog gain is controlled to a value in accordance with the illuminance by the control signal. Also, the conductance is controlled to a value in accordance with the analog gain by the switching signal CSW.

Note that it is also possible to apply the second, third, and fourth embodiments and the modification example of the third embodiment to the fifth embodiment. In a case where the second embodiment is applied, setting data is held in the register 222 in association with each of three illuminance ranges.

Figure 26:
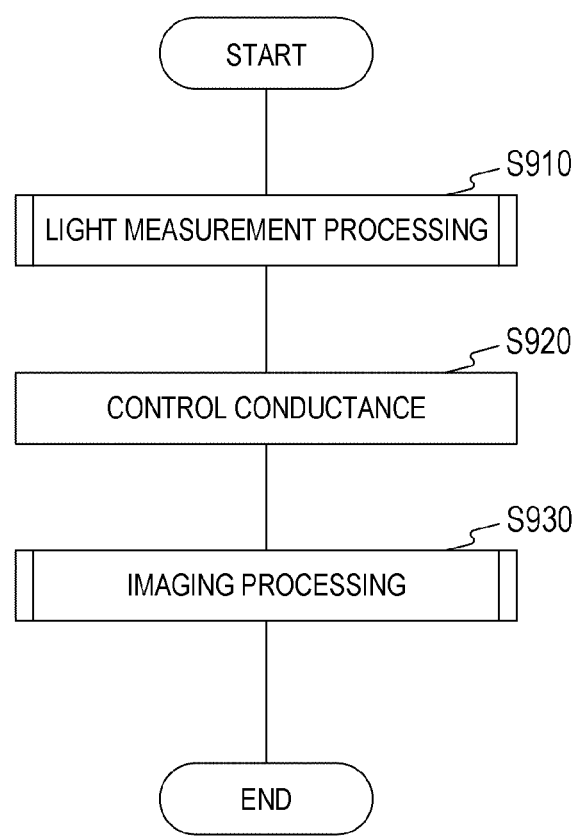
FIG. 26 is a flowchart illustrating an example of operations of the solid state imaging element according to the fifth embodiment of the present technology.

FIG. 26 is a flowchart illustrating an example of operations of the solid state imaging element 200 according to the fifth embodiment of the present technology. The operations are started when a predetermined application for capturing image data is executed, for example.

First, the solid state imaging element 200 performs light measurement processing for measuring illuminance of ambient light on the basis of image data (step S910). Then, the solid state imaging element 200 controls conductance of each of intra-comparator current sources 320 and 350 in accordance with the measured illuminance (step S920). The solid state imaging element 200 performs imaging processing for image data (step S930). After step S930, the solid state imaging element 200 ends the operations for imaging.

Note that when a plurality of pieces of image data is successively captured, steps S910 to S930 are repeatedly executed in synchronization with a vertical synchronization signal.

Figure 27:
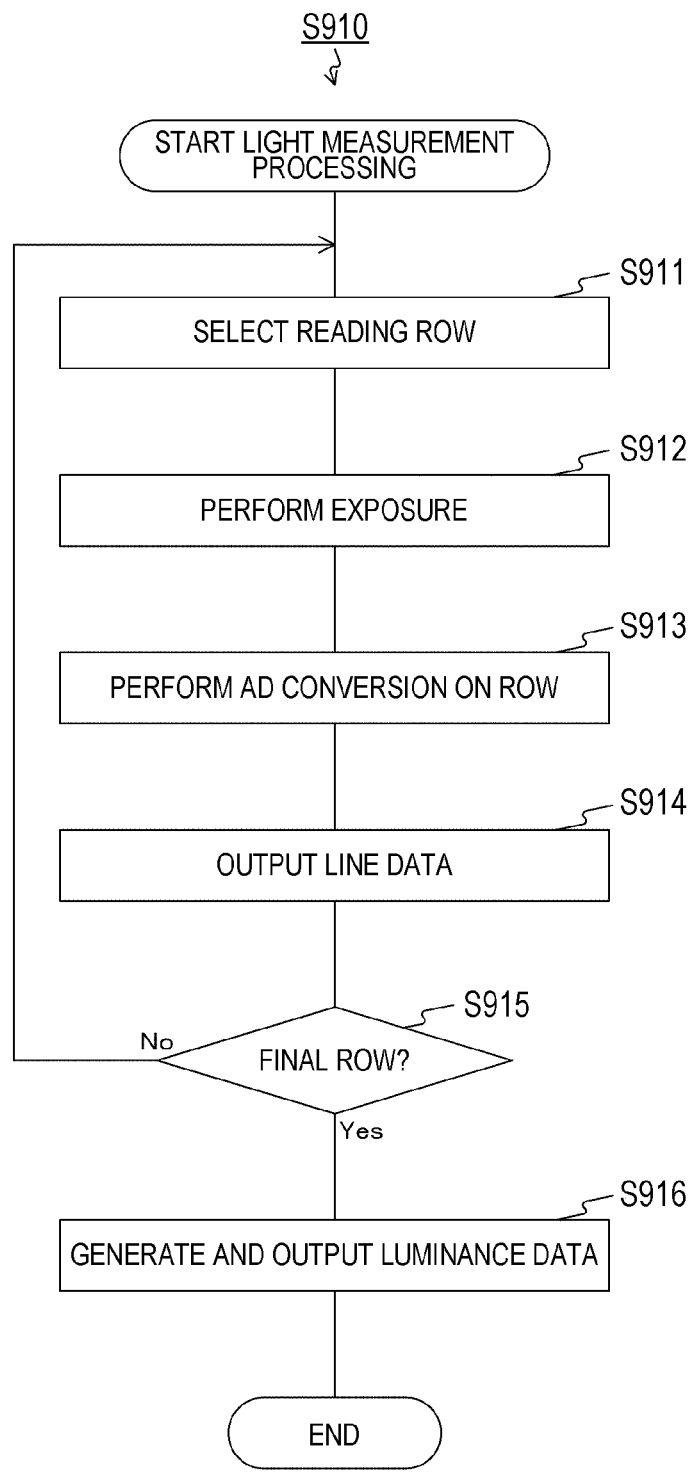
FIG. 27 is a flowchart illustrating an example of light measurement processing according to the fifth embodiment of the present technology.

FIG. 27 is a flowchart illustrating an example of light measurement processing according to the fifth embodiment of the present technology. The vertical drive section 210 selects a row to be read (step S911) and exposes the row (step S912). The column ADC 270 performs AD conversion on the read row (step S913) and outputs line data in accordance with control performed by the horizontal drive section 280 (step S914). The vertical drive section 210 determines whether or not the read row is the last row (step S915). In a case where the read row is not the last row (step S915: No), the vertical drive section 210 repeats step S911 and the following steps.

On the hand, in a case where the read row is the last row (step S915: Yes), the image processing section 290 generates illuminance data on the basis of the image data and outputs the illuminance data to the control section 221 (step S916). After step S916, the solid state imaging element 200 ends the light measurement processing.

Figure 28:
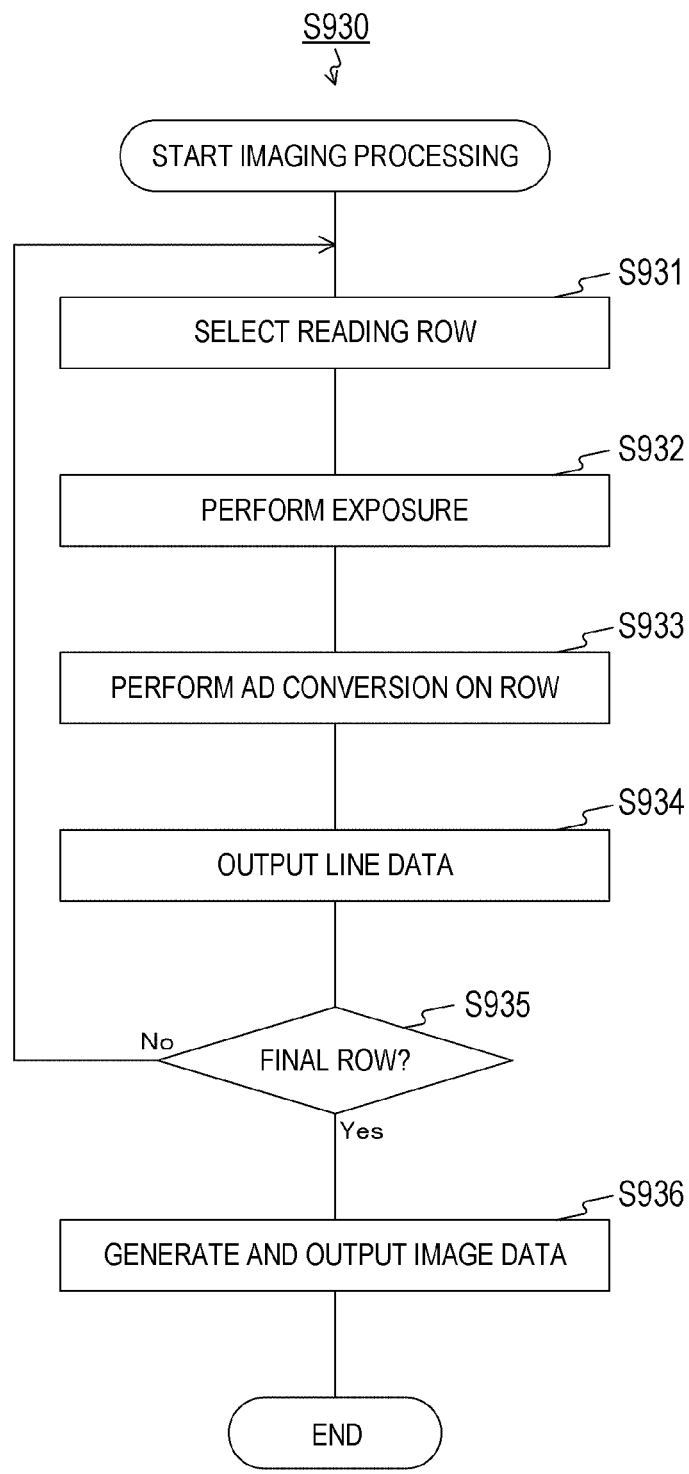
FIG. 28 is a flowchart illustrating an example of imaging processing according to the fifth embodiment of the present technology.

FIG. 28 is a flowchart illustrating an example of imaging processing according to the fifth embodiment of the present technology. The vertical drive section 210 selects a row to be read (step S931) and exposes the row (step S932). The column ADC 270 performs AD conversion on the read row (step S933) and outputs line data in accordance with control performed by the horizontal drive section 280 (step S934). The vertical drive section 210 determines whether or not the read row is the last row (step S935). In a case where the read row is not the last row (step S935: No), the vertical drive section 210 repeats step S931 and the following steps.

On the hand, in a case where the read row is the last row (step S935: Yes), the image processing section 290 generates image data by processing the line data and outputs the image data (step S936). After step S936, the solid state imaging element 200 ends the light measurement processing.

As described above, according to the fifth embodiment of the present technology, the image processing section 290 measures illuminance, the control section 221 controls the analog gain in accordance with the illuminance, and it is thus not necessary for the circuit outside the solid state imaging element 200 to control the analog gain in accordance with the illuminance. It is thus possible to reduce the amount of processing performed by the circuit outside the solid state imaging element 200.

6. Sixth Embodiment

In the aforementioned first embodiment, the comparator control section 240 controls conductance of the intra-comparator current sources 320 and 350 to expand the VSL dynamic range. However, in a case where a comparator including a differential amplifier circuit is used, it is not possible to expand the VSL dynamic range without controlling conductance of the current source outside the comparator. A solid state imaging element 200 according to a sixth embodiment is different from that in the first embodiment in that conductance of a current source outside a comparator is controlled.

Figure 29:
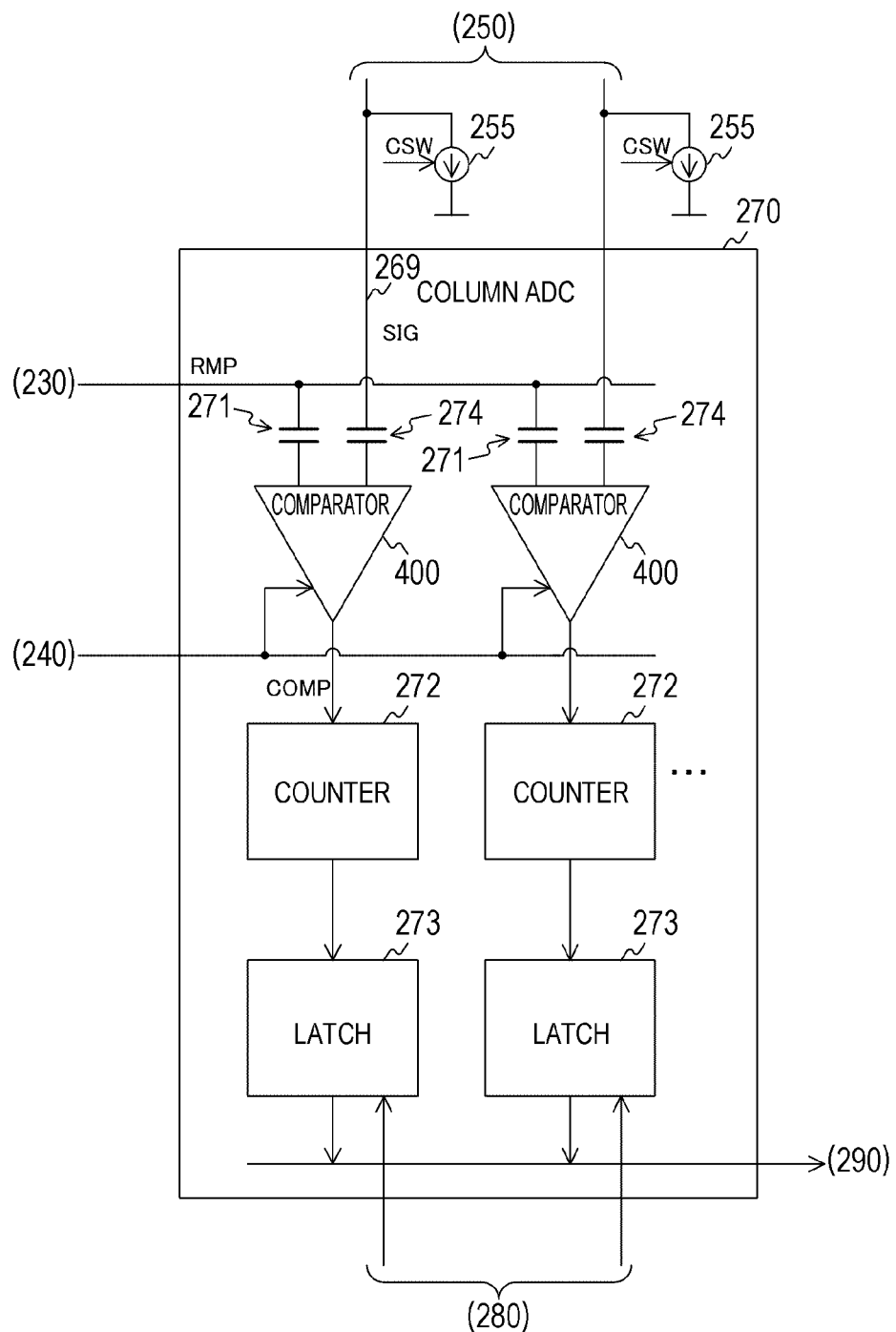
FIG. 29 is a block diagram illustrating a configuration example of a column ADC according to a sixth embodiment of the present technology.

FIG. 29 is a block diagram illustrating a configuration example of a column ADC 270 according to the sixth embodiment of the present technology. The column ADC 270 in the sixth embodiment is different from that in the first embodiment in that the column ADC 270 includes a comparator 400 instead of the comparator 300.

The comparator 400 is adapted to compare a reference signal RMP input via a capacitor 271 with a pixel signal SIG input via a capacitor 274. The comparator 400 supplies a comparison result COMP to a counter 272. A differential amplifier circuit (not illustrated) is disposed instead of the circuit illustrated as an example in FIG. 6 inside the comparator 400. Note that the differential amplifier circuit is an example of the comparison circuit described in the claims.

Also, a load MOS current source 255 is connected to each vertical signal line 269. A circuit configuration of the load MOS current source 255 is similar to that of the intra-comparator current source 320 in the first embodiment.

The comparator control section 240 in the sixth embodiment controls conductance of the load MOS current source 255 in accordance with an analog gain. In a case where the analog gain is high, the comparator control section 240 curbs RTS noise by reducing the conductance of the load MOS current source 255. Also, in a case where the analog gain is low, the comparator control section 240 expands a VSL dynamic range by increasing the conductance of the load MOS current source 255. It is thus possible to improve image quality of image data.

As described above, according to the sixth embodiment of the present technology, the comparator control section 240 controls conductance of the load MOS current source 255 in accordance with the analog gain, and it is thus possible to improve image quality in a case where the comparator 400 including the differential amplifier circuit is used.

7. Seventh Embodiment

Although a reference signal is generated by the DAC in the ramp generation section 230 in the aforementioned sixth embodiment, there may be a case where an amplitude control range lacks only with the DAC. A solid state imaging element 200 in a seventh embodiment is different from that in the sixth embodiment in that conductance of a current source in a ramp generation section 230 is further controlled.

Figure 30:
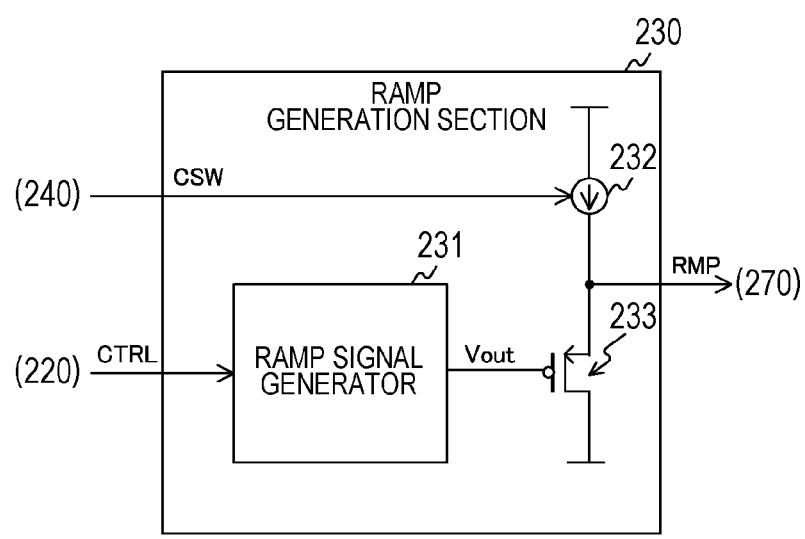
FIG. 30 is a circuit diagram illustrating a configuration example of a ramp generation section according to a seventh embodiment of the present technology.

FIG. 30 is a circuit diagram illustrating a configuration example of the ramp generation section 230 according to the seventh embodiment of the present technology. The ramp generation section 230 includes a ramp signal generator 231, a source follower current source 232, and a source follower transistor 233. A pMOS transistor, for example, is used as the source follower transistor 233.

The ramp signal generator 231 is adapted to generate an output signal Vout in a sawtooth waveform in accordance with a control signal CTRL. A DAC, for example, is used as the ramp signal generator 231. The ramp signal generator 231 supplies the generated output signal Vout to a gate of the source follower transistor 233.

The source follower current source 232 and the source follower transistor 233 are connected to each other in series between a power supply terminal and a ground terminal.

The source follower transistor 233 is adapted to output a signal in accordance with the output signal Vout as a reference signal RMP from the source to the column ADC 270.

The source follower current source 232 is adapted to generate a constant current. This circuit configuration of the source follower current source 232 is similar to that of the intra-comparator current source 320 according to the first embodiment.

Also, the comparator control section 240 according to the seventh embodiment controls conductance of the source follower current source 232 in accordance with an analog gain. In a case of a low gain, the comparator control section 240 establishes parallel connection of the current source transistors in the source follower current source 232 to increase the conductance. On the other hand, in a case of a high gain, the comparator control section 240 establishes serial connection of the current source transistors in the source follower current source 232 to reduce the conductance. It is possible to increase the amplitude control range through conductance control achieved by the source follower current source 232.

Note that although the seventh embodiment has been applied to the column ADC 270 in the sixth embodiment, the present technology is not limited to this configuration, and it is also possible to apply the seventh embodiment to the column ADC 270 in the first embodiment. Moreover, it is also possible to apply the second to fifth embodiments or the modification example of the third embodiment to the seventh embodiment.

As described above, according to the seventh embodiment of the present technology, the comparator control section 240 further controls the conductance of the source follower current source 232, and it is thus possible to increase the amplitude control range of the reference signal RMP.

8. Examples of Application to Mobile Body

The technology according to the present disclosure (present technology) can be applied to various products. For example, the technology according to the present disclosure may be realized as a device mounted on any type of mobile body such as an automobile, an electric vehicle, a hybrid electric vehicle, a motorcycle, a bicycle, a personal mobility, an airplane, a drone, a ship, or a robot.

Figure 31:
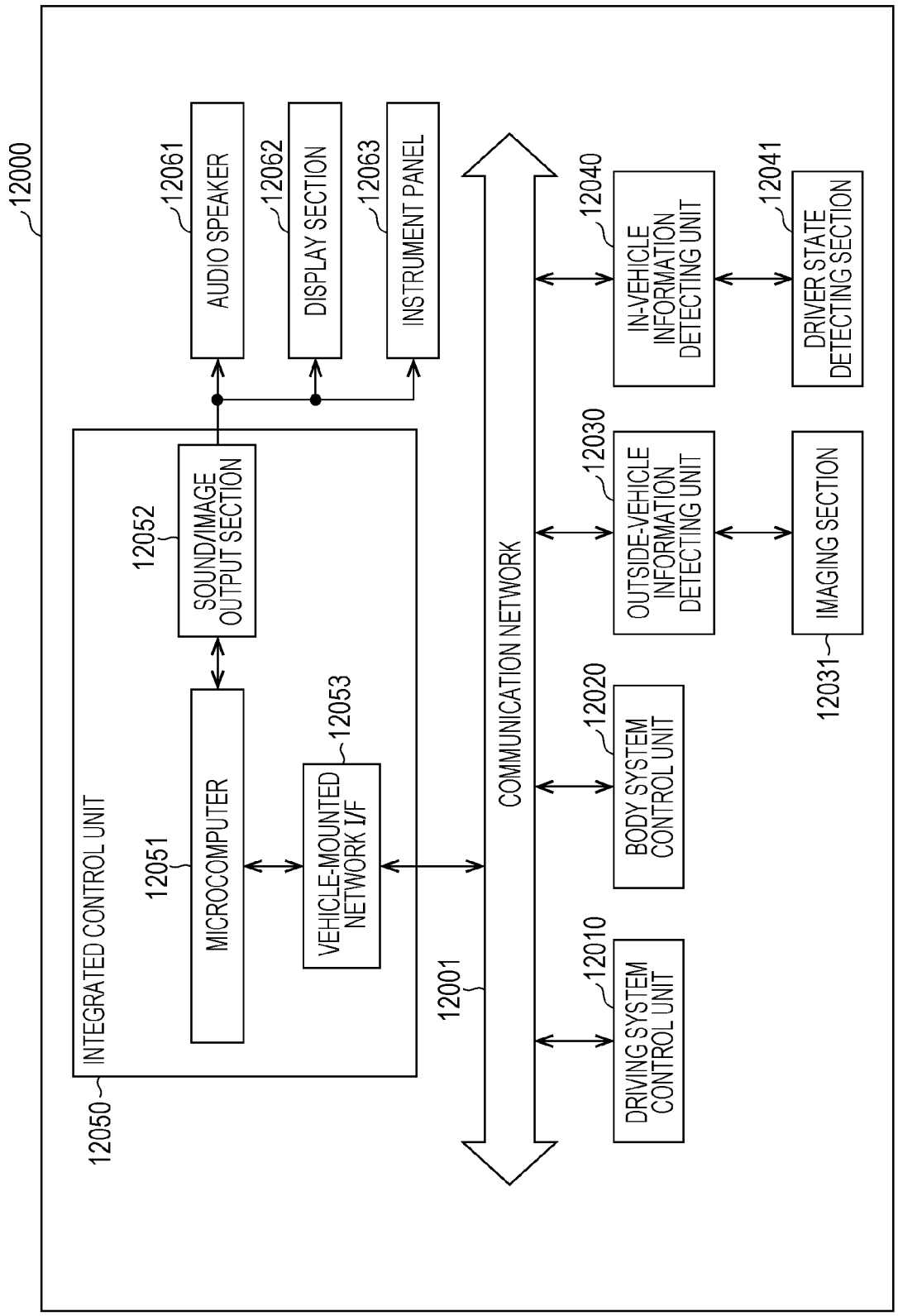
FIG. 31 is a block diagram illustrating a schematic configuration example of a vehicle control system.

FIG. 31 is a block diagram illustrating a schematic configuration example of a vehicle control system as an example of a mobile body control system to which the technology according to the present disclosure can be applied.

The vehicle control system 12000 includes a plurality of electronic control units connected to each other via a communication network 12001. In the example depicted in FIG. 31, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as functional configurations of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 31, an audio speaker 12061, a display section 12062, and an instrument panel 12063 are illustrated as the output device. The display section 12062 may, for example, include at least one of an on-board display and a head-up display.

Figure 32:
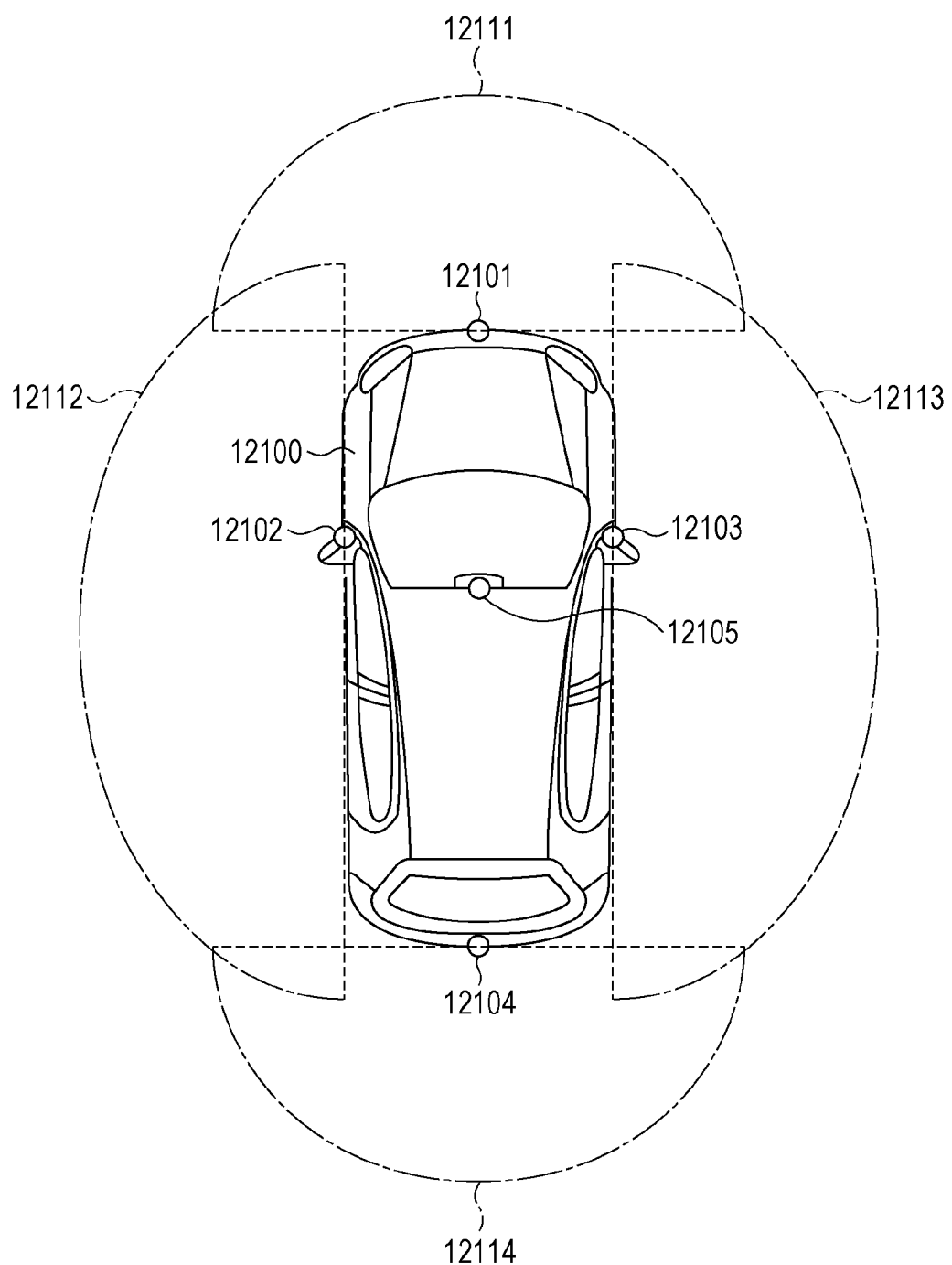
FIG. 32 is an explanatory diagram illustrating an example of an installation position of an imaging section.

FIG. 32 is a diagram depicting an example of the installation position of the imaging section 12031.

In FIG. 32, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided at the sideview mirrors obtain mainly images of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 32 illustrates an example of imaging ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the imaging section 12031 among the configurations described above. Specifically, the imaging apparatus 100 in FIG. 1 can be applied to the imaging section 12031. It is possible to obtain a captured image that is more easily seen by applying the technology according to the present disclosure to the imaging section 12031 and thereby to reduce fatigue of the driver.

Note that the aforementioned embodiments illustrate examples for embodying the present technology, and each of the matters in the embodiments and the invention specifying matters in the claims has correspondence. Similarly, each of the invention specifying matters in the claims and the matters with the same names in the embodiments of the present technology has correspondence. However, the present technology is not limited to the embodiments and can be embodied by making various modifications to the embodiments without departing from the gist thereof.

Note that the effects described in the specification are illustrated just as examples and are not limited thereto and there may be other effects.

Note that the present technology can also be configured as follows.

(1) A solid state imaging element including:
a current source that generates a constant current;
a pixel circuit that generates a pixel signal of a higher voltage than a predetermined lower limit voltage in accordance with conductance of the current source;
a comparison circuit that amplifies the pixel signal at a predetermined amplification rate and compares the amplified pixel signal with a predetermined reference signal;
a control section that reduces the conductance as the amplification rate increases; and
a counter that counts count values in a period of time until a comparison result of the comparison circuit is inverted and outputs the count values.

(2) The solid state imaging element according to (1), in which the current source includes
a plurality of transistors, and
a switching circuit that switches a connection mode of the plurality of transistors.

(3) The solid state imaging element according to (2),
in which the plurality of transistors includes first and second transistors that are connected in series to the comparison circuit, and
the switching circuit includes
a first switch that connects a connection node of the first and second transistors to a predetermined ground terminal,
a second switch that connects a source of the second transistor to the comparison circuit, and
a third switch that connects the source of the second transistor to the ground terminal.

(4) The solid state imaging element according to (2),
in which the plurality of transistors includes first, second, third, and fourth transistors that are connected in series to the comparison circuit, and
the switching circuit includes a first switch that connects a connection node of the first and second transistors to a predetermined ground terminal,
a second switch that connects a connection node of the second and third transistors to the comparison circuit,
a third switch that connects a connection node of the second and third transistors to the ground terminal,
a fourth switch that connects a connection node of the third and fourth transistors to the comparison circuit,
a fifth switch that connects a connection node of the third and fourth transistors to the ground terminal,
a sixth switch that connects a source of the fourth transistor to the comparison circuit, and
a seventh switch that connects the source of the fourth transistor to the ground terminal.

(5) The solid state imaging element according to (2), in which the plurality of transistors includes
a first transistor that has a drain connected to the comparison circuit, and
a second transistor that has a source connected to a predetermined ground terminal, and
the switching circuit includes
a first switch that connects a source of the first transistor to the ground terminal,
a second switch that connects the source of the first transistor to a drain of the second transistor, and
a third switch that connects the drain of the second transistor to the comparison circuit.

(6) The solid state imaging element according to (2), in which the plurality of transistors includes
a first transistor that has a drain connected to the comparison circuit,
second and third transistors, and
a fourth transistor that has a source connected to a predetermined ground terminal, and
the switching circuit includes
a first switch that connects a source of the first transistor to the ground terminal,
a second switch that connects the source of the first transistor to a drain of the second transistor,
a third switch that connects a drain of the second transistor to the comparison circuit,
a fourth switch that connects the source of the second transistor to the ground terminal,
a fifth switch that connects the source of the second transistor to a drain of the third transistor,
a sixth switch that connects the drain of the third transistor to the comparison circuit,
a seventh switch that connects a source of the third transistor to the ground terminal,
an eighth switch that connects the source of the third transistor to a drain of the fourth transistor, and
a ninth switch that connects the drain of the fourth transistor to the comparison circuit.

(7) The solid state imaging element according to any of (1) to (6), further including:
a bias circuit that generates a constant reference current, in which the reference current is copied by the current source.

(8) The solid state imaging element according to any of (1) to (7), further including:
an image processing section that measures illuminance on the basis of image data in which the count values are arranged,
in which the control section controls the amplification rate to a value in accordance with the illuminance.

(9) The solid state imaging element according to any of (1) to (8),
in which the pixel circuit is connected to the comparison circuit via a vertical signal line, and
the comparison circuit is inserted between the vertical signal line and the current source.

(10) The solid state imaging element according to any of (1) to (8),
in which the pixel circuit is connected to the comparison circuit via a vertical signal line, and
the current source is connected to the vertical signal line.

(11) The solid state imaging element according to any of (1) to (10), further including:
a generator that generates an output signal with a sawtooth waveform; and
a source follower transistor that outputs a signal in accordance with the output signal as the reference signal from a source,
in which the current source includes
an intra-comparator current source that is connected to the comparison circuit, and
a source follower current source that is connected to the source of the source follower transistor.

(12) An imaging apparatus including:
a current source that generates a constant current;
a pixel circuit that generates a pixel signal of a higher voltage than a predetermined lower limit voltage in accordance with conductance of the current source;
a comparison circuit that amplifies the pixel signal at a predetermined amplification rate and compares the amplified pixel signal with a predetermined reference signal;
a control section that reduces the conductance as the amplification rate increases;
a counter that counts count values in a period of time until a comparison result of the comparison circuit is inverted and outputs the count values; and
a storage section that stores image data in which digital signals indicating the count values are arranged.

(13) A method for controlling a solid state imaging element including:
a pixel signal generation procedure of generating, by a pixel circuit, a pixel signal of a higher voltage than a predetermined lower limit voltage in accordance with conductance of a current source that generates a constant current;
a comparison procedure of amplifying the pixel signal at a predetermined amplification rate and comparing the amplified pixel signal with a predetermined reference signal;
a control procedure of reducing the conductance as the amplification rate increases; and
a counting procedure of counting count values in a period of time until a comparison result of the comparison circuit is inverted and outputting the count value.

(14) A light detection device including:
a pixel that outputs a pixel signal in accordance with incident light;
a vertical signal line that transmits the pixel signal;
a comparator that includes a transistor having a source and a drain, any one of which is connected to the vertical signal line, and a gate receiving a reference signal; and
a current source that is connected to the other one of the source and the drain of the transistor,
in which the current source includes
a plurality of transistors, and a switching circuit that switches a connection mode of the plurality of transistors.

(15) The solid state imaging element according to (14), in which the plurality of transistors includes first and second transistors that are connected in series to the comparison circuit, and
the switching circuit includes
a first switch that connects a connection node of the first and second transistors to a predetermined ground terminal,
a second switch that connects a source of the second transistor to the comparison circuit, and
a third switch that connects the source of the second transistor to the ground terminal.

(16) The solid state imaging element according to (14), in which the plurality of transistors includes first, second, third, and fourth transistors that are connected in series to the comparison circuit, and
the switching circuit includes
a first switch that connects a connection node of the first and second transistors to a predetermined ground terminal,
a second switch that connects a connection node of the second and third transistors to the comparison circuit,
a third switch that connects a connection node of the second and third transistors to the ground terminal,
a fourth switch that connects a connection node of the third and fourth transistors to the comparison circuit,
a fifth switch that connects a connection node of the third and fourth transistors to the ground terminal,
a sixth switch that connects a source of the fourth transistor to the comparison circuit, and
a seventh switch that connects the source of the fourth transistor to the ground terminal.

(17) The solid state imaging element according to (14), in which the plurality of transistors includes
a first transistor that has a drain connected to the comparison circuit, and
a second transistor that has a source connected to a predetermined ground terminal, and
the switching circuit includes
a first switch that connects a source of the first transistor to the ground terminal,
a second switch that connects the source of the first transistor to a drain of the second transistor, and
a third switch that connects the drain of the second transistor to the comparison circuit.

(18) The solid state imaging element according to (14), in which the plurality of transistors includes
a first transistor that has a drain connected to the comparison circuit,
second and third transistors, and
a fourth transistor that has a source connected to a predetermined ground terminal, and
the switching circuit includes
a first switch that connects a source of the first transistor to the ground terminal,
a second switch that connects the source of the first transistor to a drain of the second transistor,
a third switch that connects a drain of the second transistor to the comparison circuit,
a fourth switch that connects a source of the second transistor to the ground terminal,
a fifth switch that connects the source of the second transistor to a drain of the third transistor,
a sixth switch that connects the drain of the third transistor to the comparison circuit, a seventh switch that connects a source of the third transistor to the ground terminal,
an eighth switch that connects the source of the third transistor to a drain of the fourth transistor, and
a ninth switch that connects the drain of the fourth transistor to the comparison circuit.

REFERENCE SIGNS LIST

100 Imaging apparatus
110 Optical section
120 DSP circuit
130 Display section
140 Operation section
150 Bus
160 Frame memory
170 Storage section
180 Power source section
200 Solid state imaging element
201 Light receiving chip
202 Circuit chip
210 Vertical drive section
220 Gain control section
221 Control section
222 Register
230 Ramp generation section
231 Ramp signal generator
232 Source follower current source
233 Source follower transistor
240 Comparator control section
241 Switching circuit
242 Bias circuit
243 Current source
244, 245, 321 to 324 Current source transistor
246 to 248, 331 to 339 Switch
250 Pixel array section
255 Load MOS current source
260 Pixel circuit
261 Photoelectric conversion element
262 Transfer transistor
263 Reset transistor
264 Floating diffusion layer
265 Amplification transistor
266 Selection transistor
270 Column ADC
271, 274, 313 Capacitor
272 Counter
273 Latch
280 Horizontal drive section
290 Image processing section
300, 400 Comparator
310 Comparison circuit
311 Input transistor
312 Auto-zero switch
314 Clamp transistor
315 Output transistor
320, 350 Intra-comparator current source
330 Switching circuit
12031 Imaging section

The invention claimed is:
1. A solid state imaging element, comprising:
a current source configured to generate a constant current, wherein
the current source includes a plurality of transistors and a switching circuit,
the switching circuit is configured to switch a connection mode of the plurality of transistors, the plurality of transistors includes a first transistor and a second transistor, and
the switching circuit includes:
a first switch configured to connect a connection node of the first transistor and a connection node of the second transistor to a specific ground terminal,
a second switch, and
a third switch configured to connect a source of the second transistor to the specific ground terminal;
a pixel circuit configured to generate a pixel signal of a higher voltage than a specific lower limit voltage, wherein the specific lower limit voltage is based on conductance of the current source;
a comparison circuit configured to:
amplify the pixel signal at a specific amplification rate, and
compare the amplified pixel signal with a specific reference signal, wherein
the first transistor and the second transistor are connected in series to the comparison circuit, and
the second switch is configured to connect the source of the second transistor to the comparison circuit;
a control section configured to reduce the conductance as the specific amplification rate increases; and
a counter configured to:
count a plurality of count values in a period of time until a comparison result of the comparison circuit is inverted; and
output the plurality of count values.

2. The solid state imaging element according to claim 1, wherein
the pixel circuit is connected to the comparison circuit via a vertical signal line, and
the comparison circuit is between the vertical signal line and the current source.

3. An imaging apparatus, comprising:
a current source configured to generate a constant current, wherein
the current source includes a plurality of transistors and a switching circuit,
the switching circuit is configured to switch a connection mode of the plurality of transistors,
the plurality of transistors includes a first transistor and a second transistor, and
the switching circuit includes:
a first switch configured to connect a connection node of the first transistor and a connection node of the second transistor to a specific ground terminal,
a second switch, and
a third switch configured to connect a source of the second transistor to the specific ground terminal;
a pixel circuit configured to generate a pixel signal of a higher voltage than a specific lower limit voltage, wherein the specific lower limit voltage is based on conductance of the current source;
a comparison circuit configured to:
amplify the pixel signal at a specific amplification rate, and
compare the amplified pixel signal with a specific reference signal, wherein
the first transistor and the second transistor are connected in series to the comparison circuit, and
the second switch is configured to connect the source of the second transistor to the comparison circuit;
a control section configured to reduce the conductance as the specific amplification rate increases;
a counter configured to:
count a plurality of count values in a period of time until a comparison result of the comparison circuit is inverted; and
output the plurality of count values; and
a storage section configured to store image data in which digital signals indicating the plurality of count values are arranged.

4. A light detection device, comprising:
a pixel configured to output a pixel signal based on incident light;
a vertical signal line configured to transmit the pixel signal;
a comparator that includes a transistor, wherein the transistor comprises;
a source;
a drain, wherein one of the source or the drain is connected to the vertical signal line; and
a gate configured to receive a reference signal; and
a current source that is connected to another one of the source or the drain of the transistor, wherein
the current source includes a plurality of transistors, and
the plurality of transistors includes a first transistor and a second transistor that are connected in series to the comparator; and
a switching circuit configured to switch a connection mode of the plurality of transistors, wherein
the switching circuit includes
a first switch configured to connect a connection node of the first transistor and a connection node of the second transistor to a specific ground terminal,
a second switch configured to connect a source of the second transistor to the comparator, and
a third switch configured to connect the source of the second transistor to the specific ground terminal.

* * * * *